US007292508B2

(12) United States Patent
Nogami et al.

(10) Patent No.: US 7,292,508 B2
(45) Date of Patent: Nov. 6, 2007

(54) OPTICAL PICK-UP DEVICE WITH RESPECTIVE FLUSH SCREWS ECCENTRICALLY POSITIONED BETWEEN AN ACTUATOR BASE AND A MAGNETIC HOLDER, TOGETHER BETWEEN A PRINTED-CIRCUIT BOARD AND A SUPPORT MEMBER

(75) Inventors: Toyosi Nogami, Osaka (JP); Yoshimasa Matsumoto, Osaka (JP)

(73) Assignee: Funai Electric Co., Ltd. (JP)

( * ) Notice: Subject to any disclaimer, the term of this patent is extended or adjusted under 35 U.S.C. 154(b) by 606 days.

(21) Appl. No.: 10/982,897

(22) Filed: Nov. 8, 2004

(65) Prior Publication Data
US 2005/0099898 A1 May 12, 2005

(30) Foreign Application Priority Data
Nov. 12, 2003 (JP) ............................. 2003-381970
Dec. 12, 2003 (JP) ............................. 2003-414960

(51) Int. Cl.
*G11B 7/00* (2006.01)
(52) U.S. Cl. ............................. 369/44.16; 369/44.15; 720/682; 720/683; 720/685
(58) Field of Classification Search ............. 369/44.16, 369/44.15, 44.21; 720/682, 683, 685
See application file for complete search history.

(56) References Cited
U.S. PATENT DOCUMENTS
5,715,231 A * 2/1998 Nagasato et al. ........... 720/682

6,988,275 B2 * 1/2006 Mitsumori et al. ......... 720/682
2001/0038581 A1 * 11/2001 Kawano et al. .......... 369/44.16
2002/0071357 A1 * 6/2002 Takahashi et al. ....... 369/44.16
2003/0161252 A1 * 8/2003 Sugawara .................. 369/244

FOREIGN PATENT DOCUMENTS
JP   2000-222751   8/2000
JP   2001-202642   7/2001

* cited by examiner

Primary Examiner—Wayne Young
Assistant Examiner—LaTanya Bibbins
(74) Attorney, Agent, or Firm—Bacon & Thomas, PLLC

(57) ABSTRACT

An optical pick-up device having cheap and simple structure capable of precisely positioning members assembled upon an actuator base makes use of respective flush screw members for a magnet holder and for a printed-circuit board eccentrically positioned between an actuator base and a magnet holder, together with between the printed-circuit board and the support member. The flush screw member is inserted through the holder hole, firmly secured into the screw hole, and thereby prevents the pick-up device from being loosened, because of being provided with a predetermined eccentric distance between center axles of the screw hole and the holder hole. Likewise, a triangle-shape opening of the printed-circuit board is adapted to receive the board flush screw, so that a slant tapered surface of a board flush head of the board flush screw acts as an eccentrically fastener for fixture and positioning of the support member and the printed-circuit board.

14 Claims, 15 Drawing Sheets

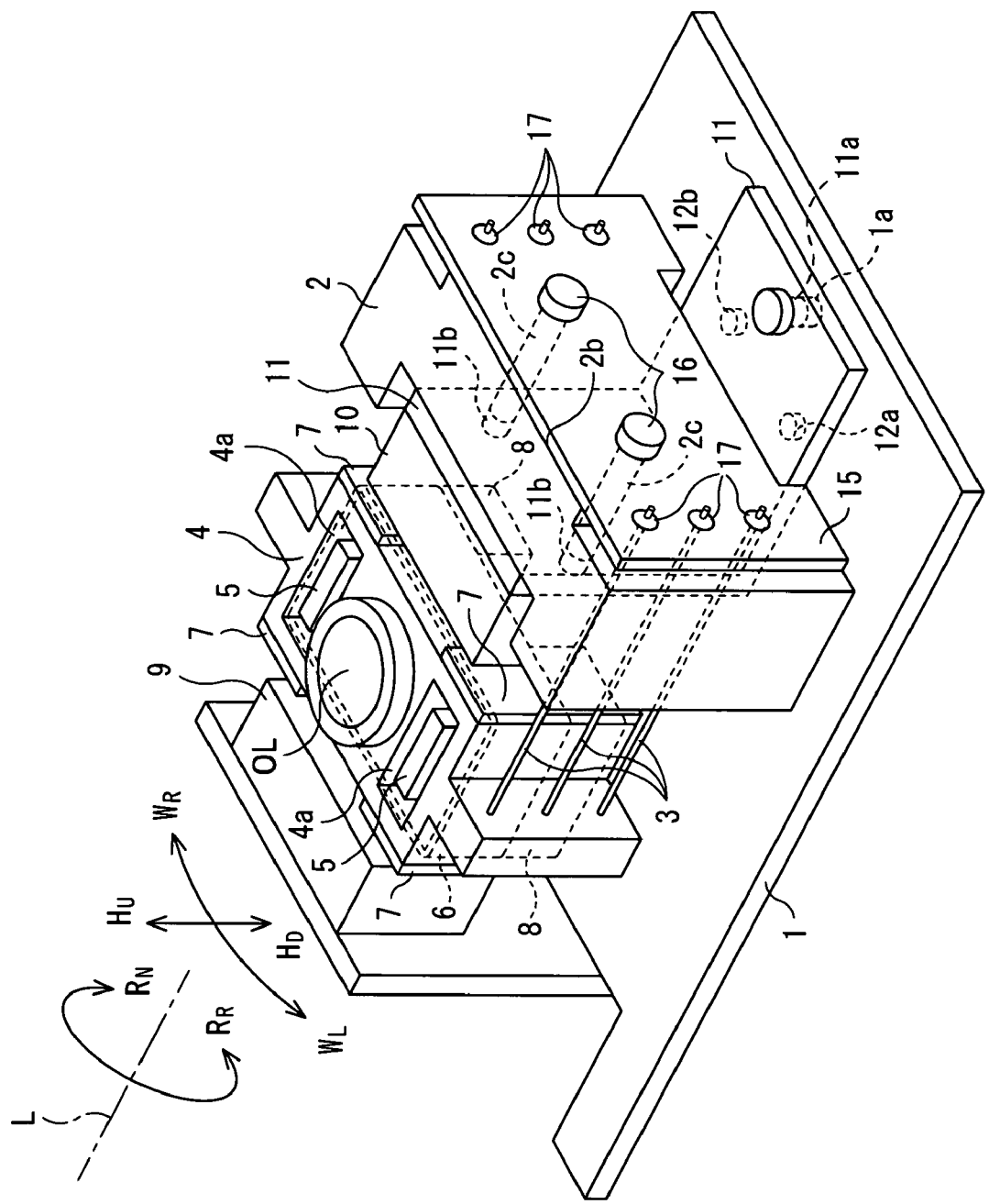

OPTICAL PICK-UP DEVICE WITH
RESPECTIVE FLUSH SCREWS
ECCENTRICALLY POSITIONED BETWEEN
AN ACTUATOR BASE AND A MAGNETIC
HOLDER, TOGETHER BETWEEN A
PRINTED-CIRCUIT BOARD AND A
SUPPORT MEMBER

CROSS-REFERENCE TO RELATED
APPLICATIONS

This application claims, under 35 USC 119, priority of Japanese Application No. 2003-381970 filed Nov. 12, 2003 and of Japanese Application No. 2003-414960 filed Dec. 12, 2003.

BACKGROUND OF THE INVENTION

1. Field of the Invention

The present invention relates to an optical pick-up device, in particular, an optical pick-up device used to a disk player for a DVD and/or a CD. The optical pick-up device used to the disk player is for reading information from the DVD and/or the CD.

2. Prior Art

In the matter which will later be described more in detail, such optical pick-up devices are already known upon laying open of the following patent documents. As a first prior art example of the optical pick-up device, there is a patent document No.1 ((Japanese Patent Application, Unexamined Prepublication (A) Kokai No.222751 of 2000 (JP2000-222751A)) entitled "Biaxial Actuator for Optical Pick-up Device". The first prior art device is provided with a damper box and a lens holder disposed upon an actuator base. Bridged with the lens holder, a plurality of resilient-conductive links are arranged with a first transit substrate (printed circuit board) fixed upon the damper box. The lens holder is elastically held in the damper box and is movable in focusing and tracking directions.

Furthermore, a patent document No.2 ((Japanese Patent Application, Unexamined Prepublication (A) Kokai No.202642 of 2001 (JP20001-202642A)) is disclosed as a second prior art example of the optical pick-up device entitled "Mounting Structure for Parts and Optical Pick-up Using Same". The second prior art device comprise an actuator base with a through hole, an elastic supporting member inserted into the through hole, and a bobbin arranged upon the elastic supporting member. The elastic supporting member and the bobbin is secured by means of a screw into the actuator base.

It is, however, disadvantageous in that these prior art devices cannot precisely position members assembled upon the actuator base and have complex structure with expensive cost for manufacture thereof

SUMMARY OF THE INVENTION

It is consequently an object of the present invention to provide an optical pick-up device having a cheap and simple structure capable of precisely positioning members assembled upon an actuator base.

Other objects of the present invention will become clear as the description proceeds.

According to the first aspect of the present invention, there is provided with an optical pick-up device capable of moving a lens holder (4) including an objective lens (OL) in three dimensional directions positioned by means of a focusing coil (6), a tracking coil (7), and/or a tilt coil (8) during operation, said optical pick-up device comprising: an actuator base (1) having one end with a screw hole (1a) and the other end in a lengthwise direction; a support member (2) arranged upon said one end of said actuator base, having a pair of side walls and a central wall (2b) formed with a through hole (2c) between said side walls, each side wall being formed with a plurality of grooves (2a); a fixed magnet (9) adjacent to said lens holder and fixed upon said other end of said actuator base; a holder magnet (10) facing said fixed magnet so as to interpose said lens holder; a magnet holder (11) having a holding portion (11H) with a screw hole (11b) for holding said holder magnet and a mount portion (11M) for slidably mounting upon said actuator base, said mount portion being composed of a mount body and a mount tongue portion (11E) which is formed with a holder hole (11a) and is elongated from said mount body; a pair of positioning pins (12a, 12b) protruding from a sliding surface of said mount portion of said magnet holder, said positioning pins being inserted in a pair of positioning holes (13a, 13b) formed with said actuator base; a printed-circuit board (15) formed with a plurality of electrode holes (15a) and a board hole (15b), said printed-circuit board being arranged with said support member; a printed-circuit screw member (20) screwed into said screw hole of said magnet holder through said board hole of said printed-circuit board and said through-hole of said support member, said printed-circuit board being fit upon said support member, with said support member and said magnet holder integrally engaged with each other; a plurality of resilient wires (3) inserted in said grooves of said support member, each resilient wire having one end soldered into said lens holder and the other end soldered through said electrode holes of said print circuit board, said lens holder being fixed with said support member through each resilient wire; and a holder screw member (19) screwed into said screw hole of said actuator base through said screw hole said magnet holder, said magnet holder being fixed upon said actuator base; wherein one (13a) of said positioning holes of said actuator base have one inner circumference face less than the other (13b) of said positioning holes, each inner circumference face forming a first standard surface in said lengthwise direction for prescribing a first standard length (13A) and a second standard surface for prescribing a second standard length (13B) in a direction orthogonal to said lengthwise direction, each of first standard surfaces of said one and the other inner circumference faces having a substantially same dimension and one second standard surface of said one inner circumference face is less than the other second surface(13C) of said other inner circumference face; wherein said holder hole of said magnet holder is eccentrically greater than said screw hole of said actuator base; wherein said holder screw member is a holder flush screw (19) having a holder flush head with a slant tapered surface(19a) secured into said holder hole, said one positioning pin being pushed and pushed and pressed onto said first standard surface; wherein said other positioning pin is pushed and pushed and pressed onto said second standard surface of said other positioning hole, whereby said holder magnet and said objective lens are positioned upon a predetermined location of said lengthwise direction and/or said direction orthogonal to said lengthwise direction of said actuator base; wherein said support member comprises a standard ledge (22) protruded from its body along a horizontal standard surface that is perpendicular to both said first standard surface and said second standard surface; wherein said printed-circuit board has a board hole (15b) with a board flush screw (20) secured into said through hole of said central wall; and wherein said board flush screw is secured to be fit through said board hole and said through hole, so that a top end (15-1) of said printed-circuit board is pushed and pushed and pressed down upon said standard ledge, whereby said printed-circuit board is fixed in a predetermined location of said support member.

In accordance with the first aspect of the invention, when the magnet holder is fixed upon the actuator base by means of the holder flush screw, the slant tapered surface of the holder flush head of the holder flush screw serves to push a circumference edge of the holder hole. By means of such a pushing force of the slant tapered surface, one positioning pin is pushed and pushed and pressed onto the first standard surface and the second standard surface of one positioning hole and at the same time the other positioning pin is pushed and pushed and pressed onto the second standard surface of the other positioning hole, whereby both the holder magnet and the objective lens are appropriately set and are positioned upon a predetermined location of the lengthwise direction and/or the direction orthogonal to the lengthwise direction of the actuator base. It is thus able to provide the optical pick-up device capable of precisely moving the focusing coil, the tracking coil, and/or the tilt coil.

The feature of the first aspect of the present invention is that the holder hole of the magnet holder is sized slightly greater than the screw hole of the actuator base with an eccentrically predetermined distance. Inasmuch as the holder flush screw is used as the holder screw member together with a small improvement of the structure of the optical pick-up device from the related art which will later be described, its cheap and simple structure is constructed, so that the optical pick-up device can precisely position a member of the magnet holder assembled upon the actuator base.

In addition thereto, when the board flush screw is secured into the through hole of the central wall of the support member, the slant tapered surface of the board flush head of the board flush screw is pushed and pushed and pressed upon a circumference edge of the board hole of the print-circuit board. By such a pushing force, the top end of the print-circuit board is pushed and pushed and pressed upon the standard ledge, so that a positioning relation between the electrode holes of the printed-circuit board and resilient wires are appropriately set to be fixed in the predetermined location of the central wall of the support member. It is thus able to provide the optical pick-up device capable of precisely moving the focusing coil, the tracking coil, and/or the tilt coil.

The additional feature of the first aspect of the present invention is that the board hole of the printed-circuit board is sized slightly greater than the through hole of the support member with a predetermined eccentric distance. Inasmuch as the board flush screw is used as a board screw member together with a small alternation of the structure of the optical pick-up device from the related art which will later be described, its cheap and simple structure is constructed, so that the optical pick-up device can precisely position both the support member and the printed circuit board assembled upon the actuator base.

According to the second aspect of the present invention, there is provided with an optical pick-up device capable of moving a lens holder (4) including an objective lens (OL) in dimensional directions positioned by means of a focusing coil (6) and/or a tracking coil (7) during operation, said optical pick-up device comprising: an actuator base (1) having one end with a screw hole (1a) and the other end in a lengthwise direction; a support member (2) arranged upon said one end of said actuator base, having a pair of side walls and a central wall (2b) formed with a through hole (2c) between said side walls, each side wall being formed with a plurality of grooves (2a); a fixed magnet (9) adjacent to said lens holder and fixed upon said other end of said actuator base; a holder magnet (10) facing said fixed magnet so as to interpose said lens holder; a magnet holder (11) having a holding portion (11H) with a screw hole (11b) for holding said holder magnet and a mount portion (11M) for slidably mounting upon said actuator base, said mount portion being composed of a mount body and a mount tongue portion (11E) which is formed with a holder hole (11a) and is elongated from said mount body; a pair of positioning pins (12a, 12b) protruding from a sliding surface of said mount portion of said magnet holder, said positioning pins being inserted in a pair of positioning holes (13a, 13b) formed with said actuator base; a printed-circuit board (15) formed with a plurality of electrode holes (15a) and a board hole (15b), said printed-circuit board being arranged with said support member; a printed-circuit screw member (20) screwed into said screw hole of said magnet holder through said board hole of said printed-circuit board and said through-hole of said support member, said printed-circuit board being fit upon said support member, with said support member and said magnet holder integrally engaged with each other; a plurality of resilient wires (3) inserted in said grooves of said support member, each resilient wire having one end soldered into said lens holder and the other end soldered through said electrode holes of said print circuit board, said lens holder being fixed with said support member through each resilient wire; and a holder screw member (19) screwed into said screw hole of said actuator base through said screw hole of said magnet holder, said magnet holder being fixed upon said actuator base; wherein one (13a) of said positioning holes of said actuator base have one inner circumference face less than the other (13b) of said positioning holes, each inner circumference face forming a first standard surface in said lengthwise direction for prescribing a first standard length (13A) and a second standard surface for prescribing a second standard length (13B) in a direction orthogonal to said lengthwise direction, each of first standard surfaces of said one and the other inner circumference faces having a substantially same dimension and one second standard surface of said one inner circumference face is less than the other second surface(13C) of said other inner circumference face; wherein said holder hole of said magnet holder is eccentrically greater than said screw hole of said actuator base; wherein said holder screw member is a holder flush screw (19) having a holder flush head with a slant tapered surface(19a) secured into said holder hole, said one positioning pin being pushed and pushed and pressed onto said first standard surface; and wherein said other positioning pin is pushed and pushed and pressed onto said second standard surface of said other positioning hole, whereby said holder magnet and said objective lens are positioned upon a predetermined location of said lengthwise direction and/or said direction orthogonal to said lengthwise direction of said actuator base.

In accordance with the second aspect of the invention, when the magnet holder is fixed upon the actuator base by means of the holder flush screw, the slant tapered surface of the holder flush head of the holder flush screw serves to push a circumference edge of the holder hole. By means of such a pushing force of the slant tapered surface, one positioning pin is pushed and pushed and pressed onto the first standard surface and the second standard surface of one positioning hole and at the same time the other positioning pin is pushed and pushed and pressed onto the second standard surface of the other positioning hole, whereby both the holder magnet and the objective lens are appropriately set and are positioned upon a predetermined location of the lengthwise direction and/or the direction orthogonal to the lengthwise direction of the actuator base.

The feature of the second aspect of the present invention is that the holder hole of the magnet holder is sized slightly greater than the through hole of the actuator base with a predetermined eccentric distance. Inasmuch as the holder flush screw is used as the holder screw member together with a small improvement of the structure of the optical pick-up device from the related art which will later be described, its cheap and simple structure is constructed, so that the optical pick-up device can precisely position a member of the magnet holder assembled upon the actuator base.

According to the third aspect of the present invention, there is provided with an optical pick-up device according to the second aspect of the present invention, wherein said support member comprises a standard ledge (22) protruded from its body along a horizontal standard surface that is perpendicular to both said first standard surface and said second standard surface; wherein said printed-circuit board has a board hole (15b) with a board flush screw (20) secured into said through hole of said central wall, said board flush screw having a board flush head with a slant tapered surface (20a); and wherein said slant tapered surface of said board flush head of said board flush screw is secured to be fit through said board hole and said through hole, so that a top end (15-1) of said printed-circuit board is pushed and pushed and pressed down upon said standard ledge, whereby said printed-circuit board is fixed in a predetermined location of said central wall of said support member.

In accordance with the third aspect of the present invention, when the board flush screw is secured into the through hole of the central wall of the support member, the slant tapered surface of the board flush head of the board flush screw is pushed and pushed and pressed upon a circumference edge of the board hole of the print-circuit board. By such a pushing force, the top end of the print-circuit board is pushed and pushed and pressed upon the standard ledge, so that a positioning relation between the electrode holes of the printed-circuit board and resilient wires are appropriately set to be fixed in the predetermined location of the central wall of the support member. It is thus able to provide the optical pick-up device capable of precisely moving the focusing coil and/or the tracking coil.

The feature of the third aspect of the present invention is that the board hole of the printed-circuit board is sized slightly greater than the through hole of the support member with a predetermined eccentrically distance. Inasmuch as the board flush screw is used as a board screw member together with a small alternation of the structure of the optical pick-up device from the related art which will later be described, its cheap and simple structure is constructed, so that the optical pick-up device can precisely position both the support member and the printed circuit board assembled upon the actuator base.

According to the fourth aspect of the present invention, there is provided with an optical pick-up device capable of moving a lens holder (4) including an objective lens (OL); said optical pick-up device comprising: a support member (2) having a through hole (2c); a printed-circuit board (15) formed with a plurality of electrode holes (15a) and a board hole (15b), said printed circuit board being arranged with said support member; a board flush screw (20) secured into said through hole of said support member, said board flush screw having a board flush head (20-1) with a slant tapered surface (20a); and a plurality of resilient wires (3) inserted in said support member, each resilient wire having one end fixed into said lens holder and the other end fixed through said electrode holes of said print-circuit board, said lens holder being arranged with said support member through each resilient wire; wherein said support member comprises a standard ledge (22) protruded from its body; wherein said board hole is a triangle-shaped opening (15b'-1) for forming an inner base surface and two inner side surfaces, said board flush screw being secured between said two inner side surfaces of said triangle-shaped opening into said support member, so that a top end (15-1) of said printed-circuit board is pushed and pushed and pressed down upon said standard ledge, whereby said printed-circuit board is positioned upon a predetermined location of said support member; wherein said resilient wires is fixed through each of said electrode hole of said printed-circuit board, so that said lens holder is displaceable by said resilient wires; wherein said one end and said other end of each resilient wire are soldered; wherein said resilient wires are symmetrically grouped into both sides of said support member; and wherein said optical pick-up further comprises a coil member as a control element for displacing said lens holder, so that said coil member is electrically connected onto a circuit pattern of said printed-circuit board through said electrode holes.

In accordance with the fourth aspect of the present invention, the triangle-shaped opening is used as a board hole for forming an inner base surface and two inner side surfaces. The two side surfaces serve as a V-shape opening edge for receiving the board flush screw.

When the board flush screw is secured between the two inner side surfaces of the V-shaped opening from its outside of the printed-circuit board into the board hole of the body of the support member, so that the top end of the printed-circuit board is pushed and pushed and pressed down upon the standard ledge. At the same time, the body of the support member serves to have a board receiving end surface for receiving an inside flat surface of the printed-circuit board. As a result, the printed-circuit board is positioned upon a predetermined location of the support member.

In addition thereto, the printed-circuit board is pushed and pushed and pressed down to so as to be fit in a shallow dent composed of the body and the standard ledge of the support member, so that it prevents the board flush screw from being loosened and rotated in the direction fastened thereby. As a result, it can prevent displacement of the printed-circuit board for the member. Besides, such a fastening step upon arrangement of the printed-circuit board and the support member with the resilient wires fixed in the electrode holes brings about precisely positioning in place of the resilient wires. The ends of the resilient wires are precisely fixed upon the printed-circuit board.

Furthermore, the resilient wires are fixed with the lens holder, so that the lens holder is displaceable by the resilient wires. When both ends of the resilient wire are soldered and the resilient wires are connected to a pattern of the printed-circuit board, such that an electric connection can be realized. Each group of the resilient wires is symmetrically disposed with each other so as to be in a face-to-face position upon both sides of the support member.

Such a coil member as a control element serves to displace the lens holder. And, the coil member is electrically connected onto the circuit pattern of the printed-circuit board through the electrode holes. As a result, a control signal for driving the coil members can be communicated via the circuit pattern of the printed-circuit board.

According to the fifth aspect of the present invention, there is provided with an optical pick-up device capable of moving a lens holder (4) including an objective lens (OL); said optical pick-up device comprising: a support member (2) having a through hole (2c); a printed-circuit board (15) formed with a plurality of electrode holes (15a) and a board hole (15b), said printed circuit board being arranged with said support member; a board flush screw (20) secured into said through hole of said support member, said board flush screw having a board flush head (20-1) with a slant tapered surface (20a); and a plurality of resilient wires (3) inserted in said support member, each resilient wire having one end fixed into said lens holder and the other end fixed through said electrode holes of said print-circuit board, said lens holder being arranged with said support member through each resilient wire; wherein said support member comprises a standard ledge (22) protruded from its body; and wherein said board hole is a triangle-shaped opening (15b'-1) for forming an inner base surface and two inner side surfaces, said board flush screw being secured between said two inner side surfaces of said triangle-shaped opening into said support member, so that a top end (15-1) of said printed-circuit board is pushed and pushed and pressed down upon said standard ledge, whereby said printed-circuit board is positioned upon a predetermined location of said support member.

In accordance with the fifth aspect of the present invention, the triangle-shaped opening is used as a board hole for forming an inner base surface and two inner side surfaces. The two side surfaces serve as a V-shape opening edge for receiving the board flush screw.

When the board flush screw is secured between the two inner side surfaces of the V-shaped opening from its outside of the printed-circuit board into the through hole of the body of the support member, the top end of the printed-circuit board is pushed and pushed and pressed down upon the standard ledge. At the same time, the body of the support member serves to have a board receiving end surface for receiving an inside flat surface of the printed-circuit board. As a result, the printed-circuit board is positioned upon a predetermined location of the support member.

In addition thereto, the printed-circuit board is pushed and pushed and pressed down to so as to be fit in a shallow dent composed of the body and the standard ledge of the support member, so that it prevents the board flush screw from being loosened and rotated in-the direction fastened thereby. As a result, it can prevent displacement of the printed-circuit board for the support member. Besides, such a fastening step upon arrangement of the printed-circuit board and the support member with the resilient wires fixed in the electrode holes brings about precisely positioning in place of the resilient wires. The ends of the resilient wires are precisely fixed upon the printed-circuit board.

According to the sixth aspect of the present invention, there is provided with an optical pick-up device according to the fifth aspect of the present invention, wherein each of said resilient wires is fixed through each of said electrode holes of said printed-circuit board, so that said lens holder is displaceable by said resilient wires.

In accordance with the sixth aspect of the present invention, the resilient wires are fixed with the lens holder, so that the lens holder is displaceable by the resilient wires.

According to the seventh aspect of the present invention, there is provided with an optical pick-up device according to the fifth aspect or the sixth aspect, wherein said one end and said other end of each resilient wire are soldered.

In accordance with the seventh aspect of the present invention, when both ends of the resilient wire are soldered and the resilient wires are connected to a pattern of the printed-circuit board, such that an electric connection can be realized.

According to the eighth aspect of the present invention, there is provided with an optical pick-up device according to the sixth aspect or the seventh aspect of the present invention, wherein said resilient wires are symmetrically grouped into both sides of said support member.

In accordance with the eighth aspect of the present invention, each group of the resilient wires is symmetrically disposed with each other so as to be in a face-to-face position upon both sides of the support member.

According to the ninth aspect of the present invention, there is provided with an optical pick-up device according to any of the fifth through eighth aspects of the present invention, wherein said optical pick-up further comprises a coil member as a control element for displacing said lens holder, so that said coil member is electrically connected onto a circuit pattern of said printed-circuit board through said electrode holes.

In accordance with the ninth aspect of the present invention, such a coil member as a control element serves to displace the lens holder. And, the coil member is electrically connected onto the circuit pattern of the printed-circuit board through the electrode holes. As a result, a control signal for driving the coil members can be communicated via the circuit pattern of the printed-circuit board.

BRIEF DESCRIPTION OF THE DRAWING

FIG. 1 is a perspective view showing an optical pick-up device of the related art of the present invention;

FIG. 2A is a top view of a part of the optical pick-up device showing a first state for positioning, FIG. 2B is a cross-sectional view taken along a dash-dot line IIB-IIB of FIG. 2A, FIG. 2C is a top view of a part of the optical pick-up device showing a second state for positioning, and FIG. 2D is a cross-sectional view taken along a dash-dot line IID-IID of FIG. 2C;

FIG. 3A is a top view of a part of the optical pick-up device showing a first state for positioning, FIG. 3B is a cross-sectional view taken along a dash-dot line IIIB-IIIB depicted in FIG. 3B, FIG. 3C is a top view of the part of the optical pick-up device showing a second state for positioning, and FIG. 3D is a cross-sectional view taken along a dash-dot line IIID-IIID of FIG. 3C;

FIG. 8A is a top view of a part of the optical pick-up device showing a first state for positioning, FIG. 8B is a cross-sectional view taken along a dash-dot line VIIIB-IIIB of FIG. 8A, FIG. 8C is a top view of a part of the optical pick-up device showing a second state for positioning, and FIG. 8D is a cross-sectional view taken along a dash-dot line VIIID-VIIID of FIG. 8C;

FIG. 9A is a top view of a part of the optical pick-up device showing a first state for positioning, FIG. 9B is a cross-sectional view taken along a dash-dot line IXB-IXB of FIG. 9A, FIG. 9C is a top view of a part of the optical pick-up device showing a second state for positioning, and FIG. 9D is a cross-sectional view taken along a dash-dot line IXD-IXID of FIG. 9C;

DESCRIPTION OF THE PREFERRED EMBODIMENTS

Description of the Related Art

Figure 2A:
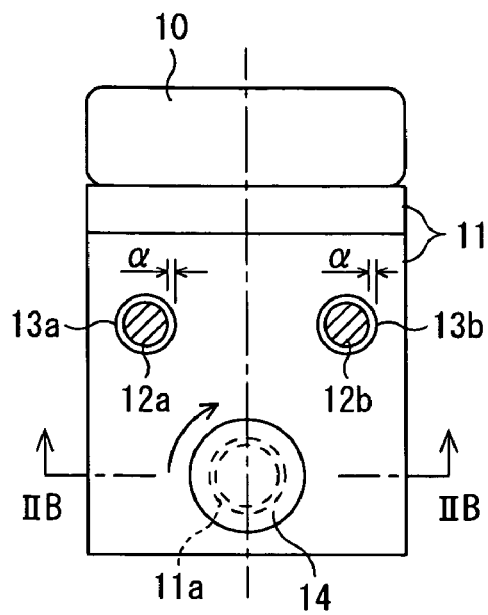
FIGS. 2A through 2D show a structure for positioning a magnet holder of the optical pick-up device depicted in FIG. 1, where
Figure 2B:
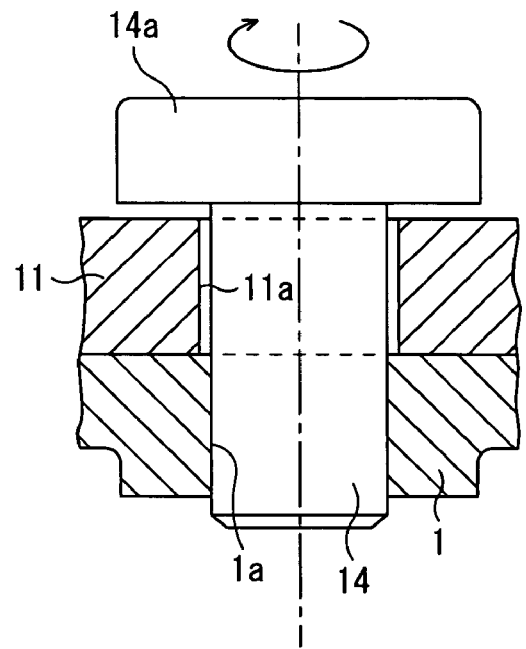
Figure 2C:
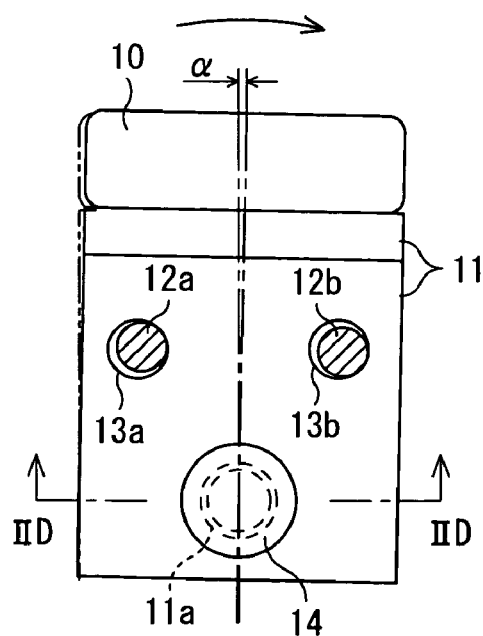
Figure 2D:
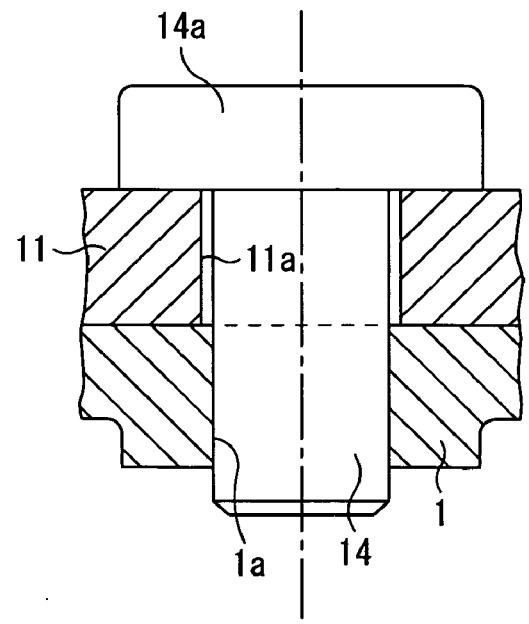
Figure 3A:
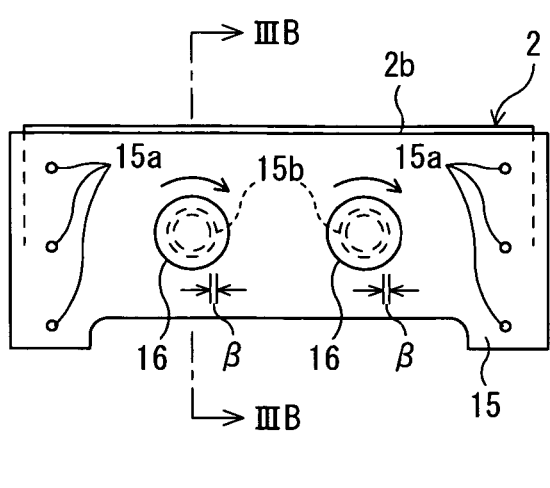
FIG. 3A through 3D show a structure for positioning a printed circuit board upon a support member of the optical pick-up device, where
Figure 3B:
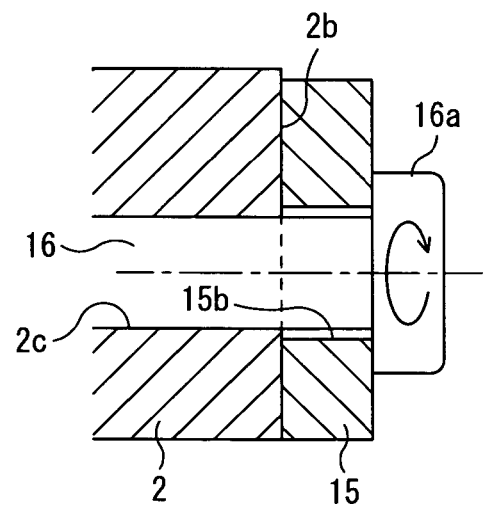
Figure 3C:
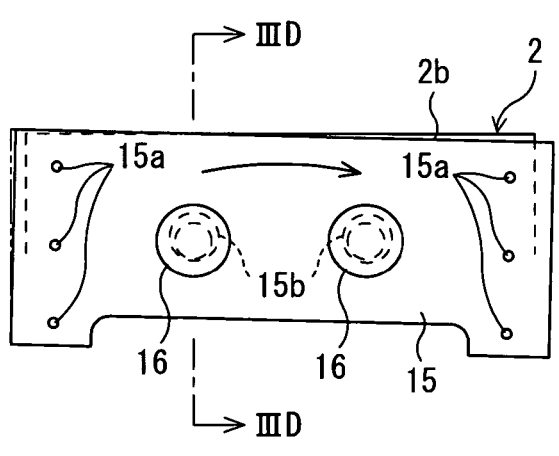
Figure 3D:
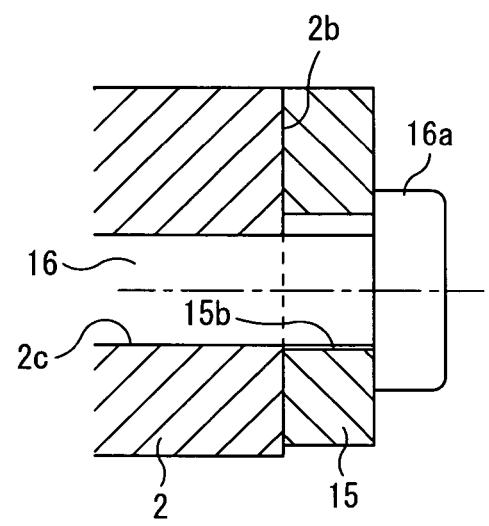
Figure 4:
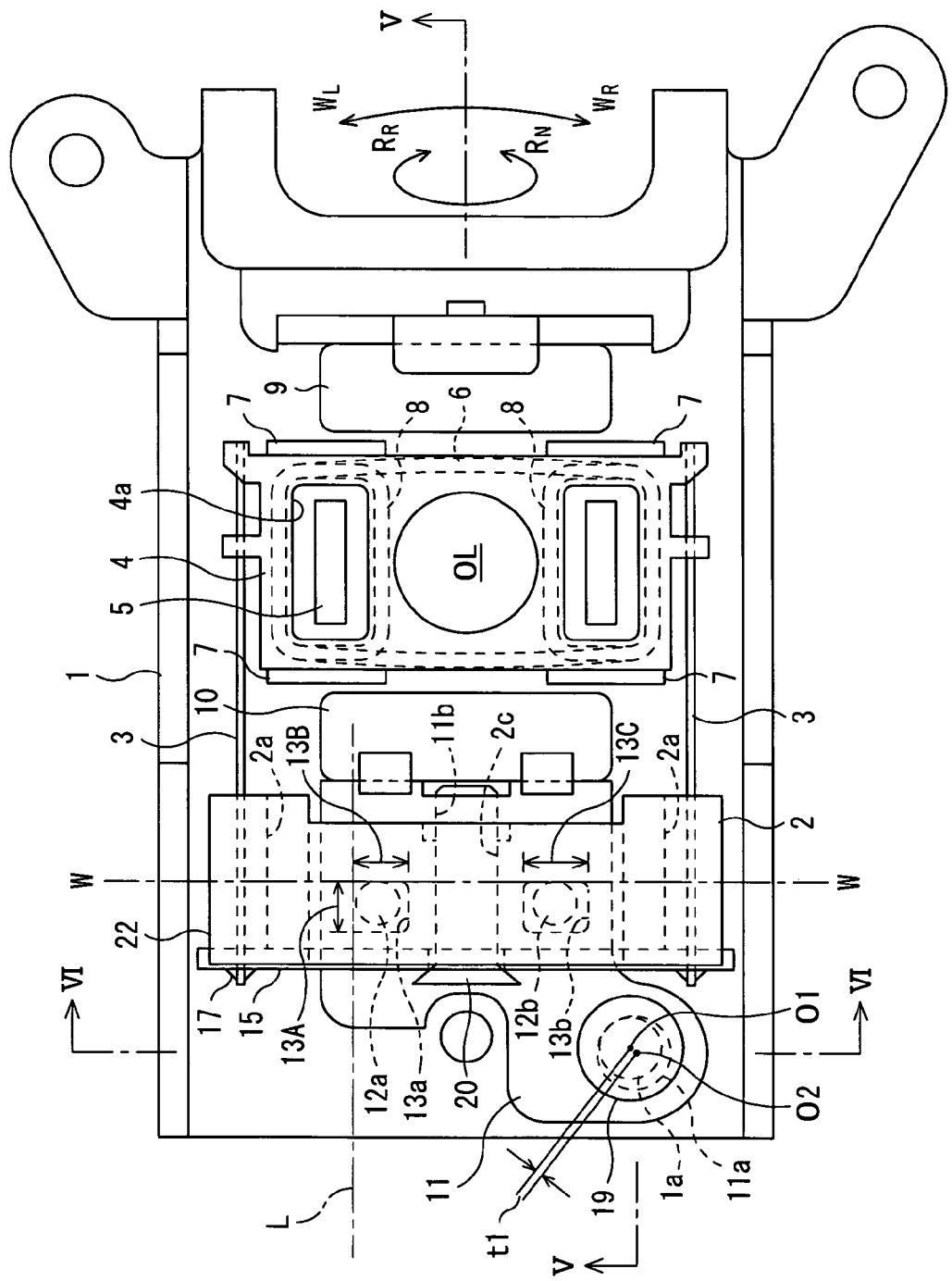
FIG. 4 is a top view of an optical pick-up device according to one embodiment of the present invention.
Figure 5:
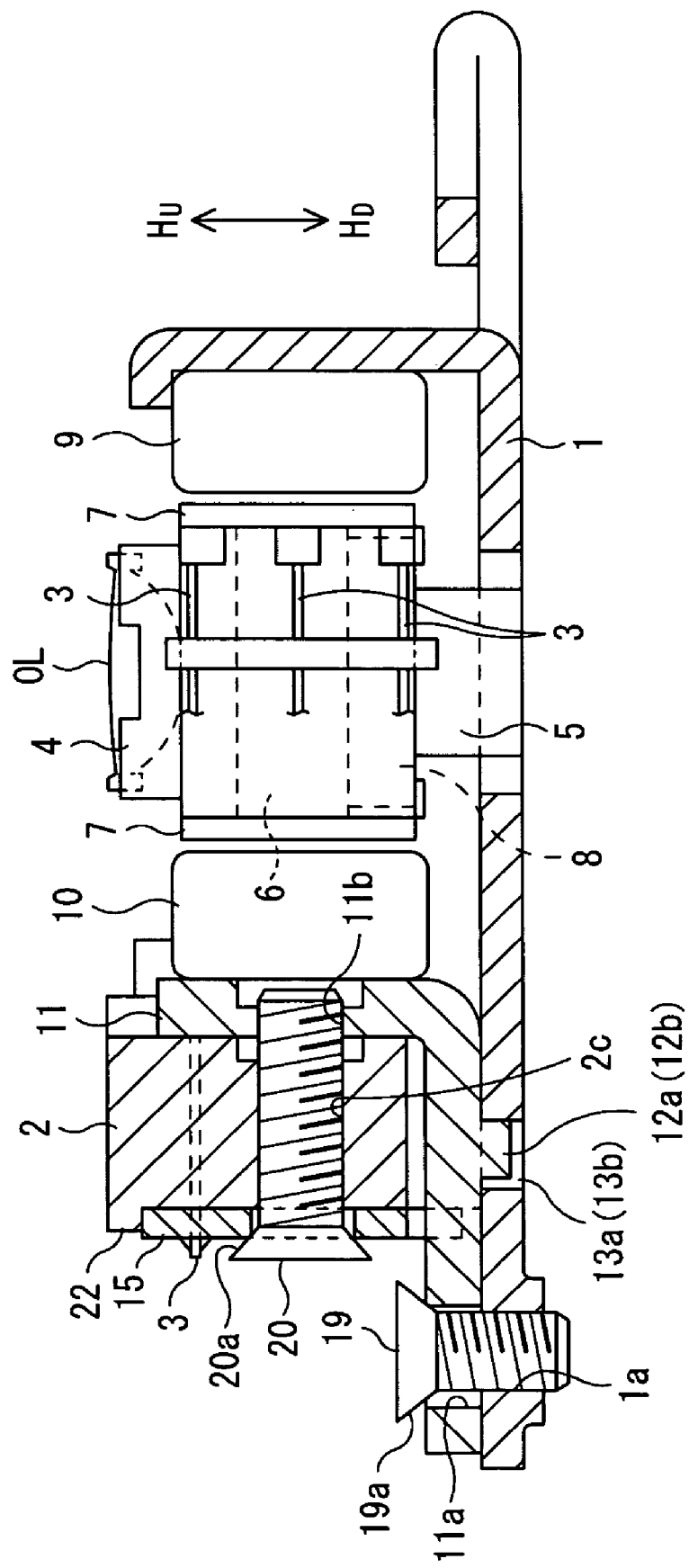
FIG. 5 is a cross-sectional view of the optical pick-up device taken along a dash-dot line V-V depicted in FIG. 4.
Figure 6:
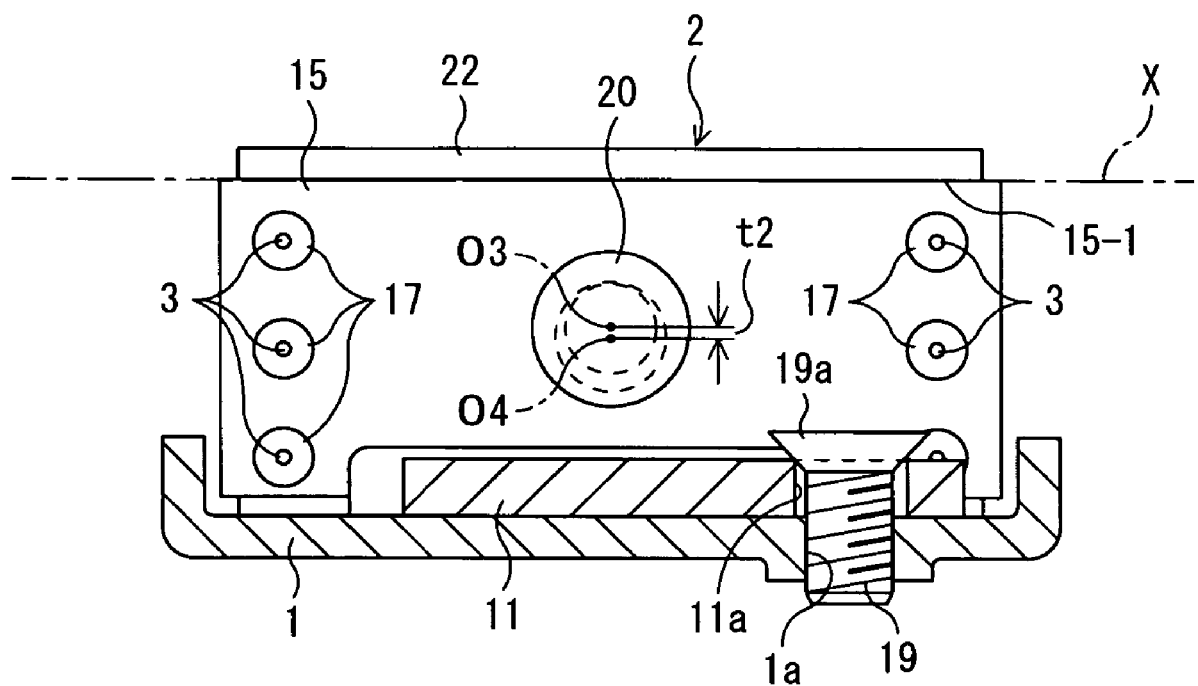
FIG. 6 is a cross-sectional view of the optical pick-up device taken along a dash-dot line VI-VI line illustrated in FIG. 4.

Referring now to FIGS. 1 through 3D, the related art optical pick-up device will be described in order to facilitate an understanding of the present invention.

The related art optical pick-up device comprises an actuator base 1, a support member 2 disposed upon one end of the actuator base 1, and a lens holder 4 with an objective lens OL facing the supporting member 2 upon the actuator base 1. The lens holder 4 has a pair of ends with a pair of yoke holes, a yoke 5 being inserted into each yoke hole. The lens holder 4 includes coil means of a focusing coil 6, a tracking coil 7, and a tilt coil 8.

The related art optical pick-up device further comprises a fixed magnet 9 adjacent to the lens holder 4 and fixed upon the other end of the actuator base 1, a holder magnet 10 facing the fixed magnet so as to interpose the lens holder 4, a magnet holder 11 having a holding portion with a holder hole 11a for holding the holder magnet 10 and a mount portion with a screw hole 11b for mounting upon the actuator base 1 with slidably arranged upon the actuator base 1, a pair of positioning pins 12a, 12b protruding from a sliding surface of the mount portion of the magnet holder 11, the positioning pins 12a, 12b being inserted in a pair of positioning holes 13a, 13b formed with the actuator base 1, a printed-circuit board 15 formed with a plurality of electrode holes 15a and a board hole 15b, the printed-circuit board 15 being arranged with the support member 2, a plurality of printed-circuit screw member 16 screwed into the screw hole 11b of the magnet holder 11 through the board hole 15b of the printed-circuit board 15 and the through-hole 2c of the support member 2, the printed-circuit board 15 being fit upon the support member 2, with the support member 2 and the magnet holder 11 integrally engaged with each other, a plurality of resilient wires 3 inserted in the grooves of the support member 2, each resilient wire 3 having one end soldered into the lens holder 4 and the other end soldered through the electrode holes 15a of the print circuit board 15, the lens holder 4 being fixed with the support member 2 through each resilient wire 3, and a holder screw member 14 screwed into the screw hole 1a of the actuator base 1 through the holder hole 11a of the magnet holder 11, the magnet holder 11 being fixed upon the actuator base 1.

It is, however, disadvantageous in that it is difficult to precisely position not only a magnet holder 11 for holding a holder magnet 10 on an actuator base 1, but also a printed circuit board 15 on a support member 2 arranged on the actuator base 1.

One Embodiment of the Present Invention

Referring to FIGS. 4 through 11D, the description will proceed to an optical pick-up device according to one embodiment of the present invention. Throughout the following, similar parts are designated by like reference numerals.

As best shown in FIGS. 4 through 7 and 10, the optical pick device is capable of moving a lens holder 4 including an objective lens OL in three dimensional directions positioned by means or coil members of a focusing coil 6, a tracking coil 7, and/or a tilt coil 8 during operation. It should be noted that the feature of the optical pick-up device make a use of respective flush screw members 19, 20 for a magnet holder 11 and for a printed-circuit board 15 eccentrically positioned between an actuator base 1 and a magnet holder 11, together with between the printed-circuit board 15 and the support member 2.

The optical pick-up device comprises the actuator base 1 having one end with a screw hole 1a and the other end with a holding base 1H for holding a fixed magnet 9 in a lengthwise direction, the support member 2 arranged upon the one end of the actuator base 1, having a pair of side walls and a central wall 2b formed with a through hole 2c between the side walls, each side wall being formed with a plurality of (three) grooves 2a, the fixed magnet 9 adjacent to the lens holder 4 and fixed upon the other end of the actuator base 1, a holder magnet 10 facing the fixed magnet 9 so as to interpose the lens holder 4, the magnet holder 11 having a holding portion 11H with a holder hole 11a for holding the holder magnet 10 and a mount portion 11M with a screw hole 11b for mounting upon the actuator base 1 so as to be slidably arranged upon the actuator base 1.

As illustrated in FIGS. 7 through 9E, the optical pick-up device further comprises a pair of column-shaped positioning pins 12a, 12b protruding from a sliding surface or bottom surface of the mount portion 11M of the magnet holder 11, the positioning pins 12a, 12b being inserted in a pair of rectangular-shaped positioning holes 13a, 13b formed with the actuator base 1. The mount portion 11M of the magnet holder 11 has a mount tongue portion 11E elongated from its mount body. The mount tongue portion 11E is formed with the holder hole 11a so as to be in correspondence to the screw hole 1a of the actuator base 1a. The mount body of the mount portion 11M of the magnet holder 11 is formed with the column-shaped positioning pins 12a, 12b so as to be in correspondence to the rectangular-shaped positioning holes 13a, 13b of the actuator base 1. The holder flush screw 19 serves to be inserted through the holder hole 11a, to be firmly secured into the screw hole 1a, and to thereby prevent the pick-up device from being loosened, because of being provided with a predetermined eccentric distance t1 between a center of axle O1 of the screw hole 1a and a center of axle O2 of the holder hole 11a.

Figure 8A:
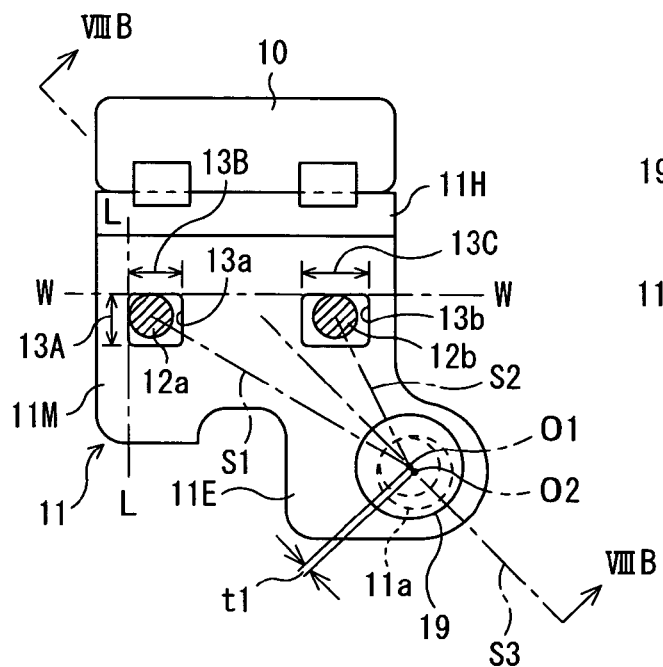
FIGS. 8A through 8D show a structure for positioning a magnet holder of the optical pick-up device depicted in FIG. 4, where

With reference to FIG. 8A among FIGS. 8A through 8D, each cross virtual lines S1, S2 intersecting with an angle less than forty-five degrees is represented by a dash-dot line, together with a predetermined eccentric distance t1 between a center of axle O1 of the screw hole 1a and a center of axle O2 of the holder hole 11a. Each intermediate virtual line S3 between the virtual lines S1 and S2 is approximately identical to a dash-dot line VIIIB-VIIIB. Therefore, together with the column-shaped positioning pins 12a, 12b positioned to be eccentrically disposed upon alternative inner side faces along the dash-dot line W-W, the eccentrically predetermined distance t1 serves as an away interval between the center of axle O1 and the center of axle O2.

Figure 8B:
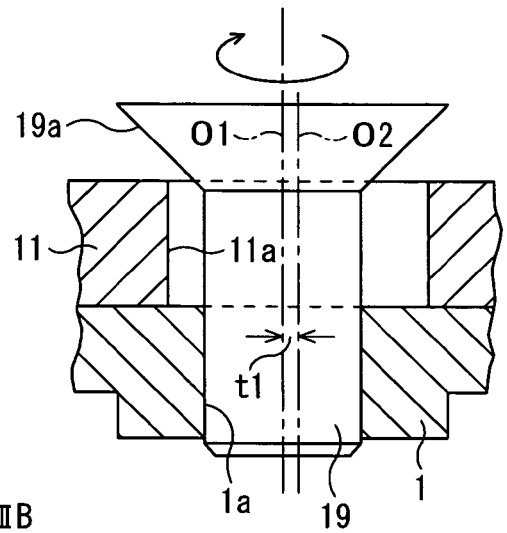
Figure 8C:
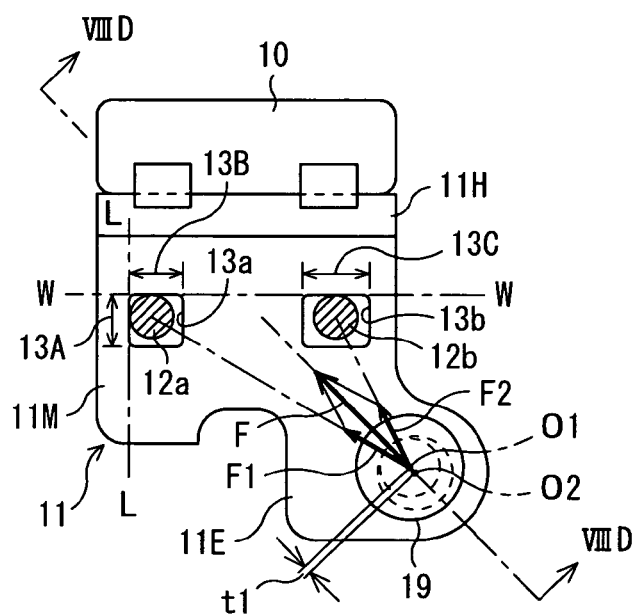
Figure 8D:
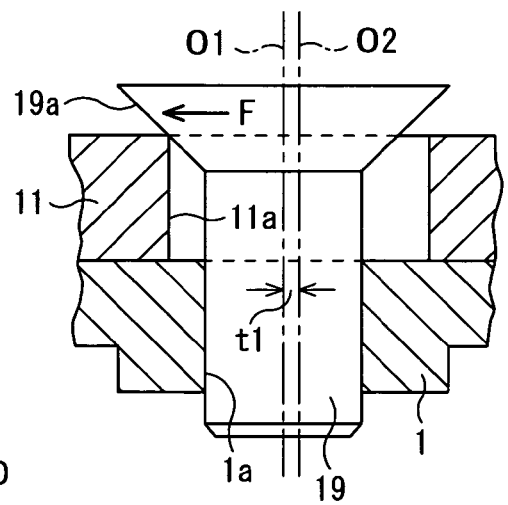

Referring to FIGS. 8A and 8B, the description will be made as to an operation for positioning the holder magnet 10 and the objective lens OL. First, the holder flush screw 19 is prepared with such assembled members upon the one end of the actuator base 1. Second, the slant tapered surface 19a of the holder flush screw 19 is directed into the mount tongue portion 19E and is secured to the screw hole 1a through the holder hole 11a of the magnet holder 11. Likewise shown in FIGS. 8C and 8D, the slant tapered surface 19a of the holder flush screw 19 is pushed and pushed and pressed down upon a circumference edge of the holder hole 11a to push a circumference edge of the holder hole 11a. By means of such a component of force F1 from a pushing force F of the slant tapered surface 19a, one positioning pin 12a is pushed and pushed and pressed onto a first standard surface represented for its dimension by reference numeral 13A along the dash-dot line L-L thereon and a second standard surface represented for its dimension by reference numeral 13B along the dash-dot line W-W thereon of one positioning hole 12a and at the same time, by another component of force F2, the other positioning pin 12b is pushed and pushed and pressed onto another second standard surface represented for its dimension by reference numeral 13C along the dash-dot line P thereon of the other positioning hole 12b. As a result, both of the holder magnet 10 and the objective lens OL are appropriately set and are positioned upon a predetermined location of the lengthwise direction of the dash-dot line L-L and/or the width direction of the dash-dot line W-W orthogonal or perpendicularly to the dash-dot line L-L of the actuator base 1.

As illustrated in FIGS. 9A through 9D, in another optical-pick up device fabricated by the use of another structure for positioning the magnet holder 11 with the holder magnet 10 and the objective lens OL upon the actuator base 1, it should be noted that the rectangular-shaped positioning holes 13a, 13b are formed to be eccentrically disposed in an alternative face-to-face way so as to interpose the dash-dot line W-W. Each cross virtual lines S1, S2 intersecting with an angle of an approximately forty five degrees is represented by a dash-dot line, together with a predetermined eccentric distance t1 between a center of axle O1 of the screw hole 1a and a center of axle O2 of the holder hole 11a. An intermediate virtual line S4 is orthogonal to a cross virtual line S1 and is approximately identical to a dash-dot line IXB-IXB. Therefore, the eccentrically predetermined distance t1 serves as an away interval between the center of axle O1 and the center of axle O2, together with the column-shaped positioning pins 12a, 12b positioned to be eccentrically disposed upon alternative second standard surfaces of 13B and 13C along the dash-dot line W-W.

Figure 9A:
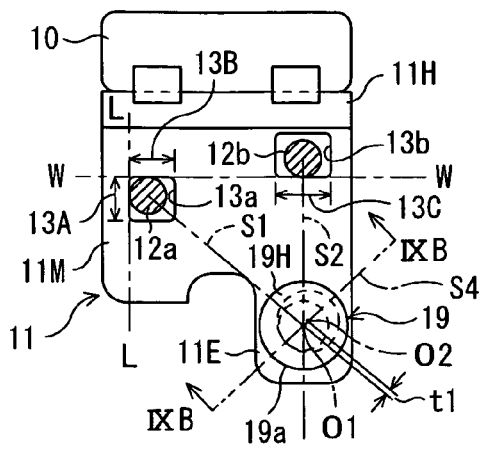
FIGS. 9A through 9D show another structure for positioning the magnet holder of the optical pick-up device depicted in FIG. 4, where
Figure 9B:
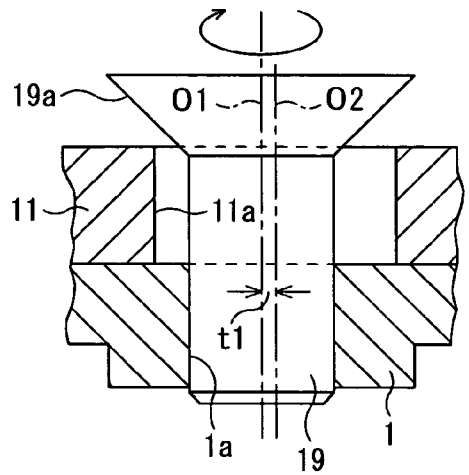
Figure 9C:
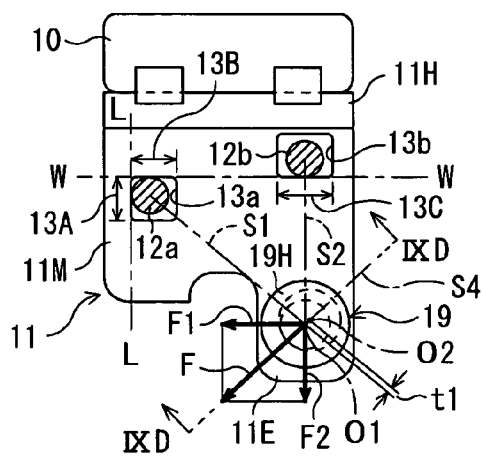
Figure 9D:
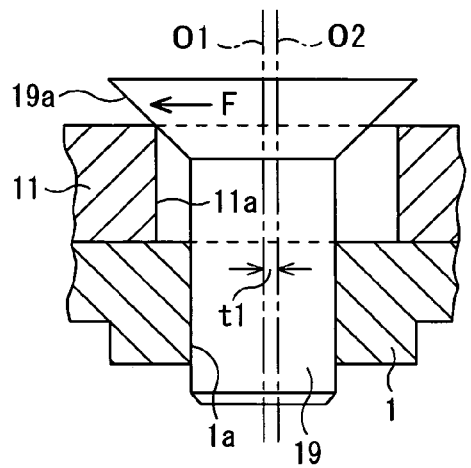
Figure 9E:
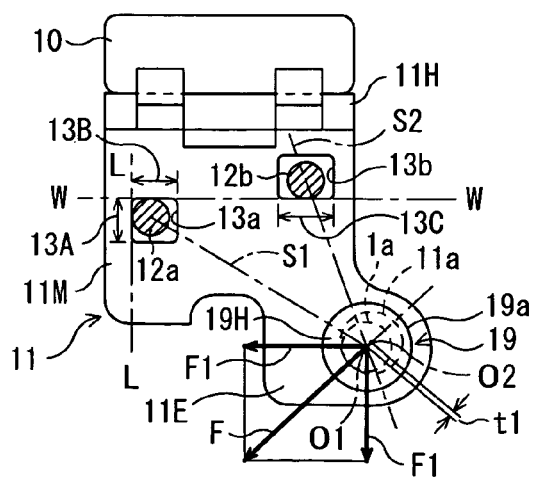
FIG. 9E is a top view of a modification of another structure of the optical pick-up device depicted in FIGS. 9A through 9D.

As shown in FIG. 9E, a modification device of another structure of the mount portion of the magnet holder 11 is a combination of the respective mount portions depicted in FIGS. 8A through 8D and 9A through 9D. The feature of the modification is formed with an angle between two cross virtual lines S1 and S2 so as to be protracted less than forty-five degrees.

In contrast with FIG. 9C, both of the holder magnet 10 and the objective lens OL are further eccentrically positioned to thereby appropriately set upon a predetermined location of the lengthwise direction of the dash-dot line L-L and/or the width direction W-W.

Each virtual lines S1, S2 is represented by a dash-dot line between the one and the other of the rectangular-shaped positioning holes 13a and 13b. Both of the virtual lines S1 and S2 is approximately identical to a dash-dot line VIIIB-VIIIB for taking the figure therealong. Therefore, the eccentrically predetermined distance t1 is away between the center of axis O1 of the screw hole 1a and the center of axis O2 of the holder hole 11a.

Figure 10:
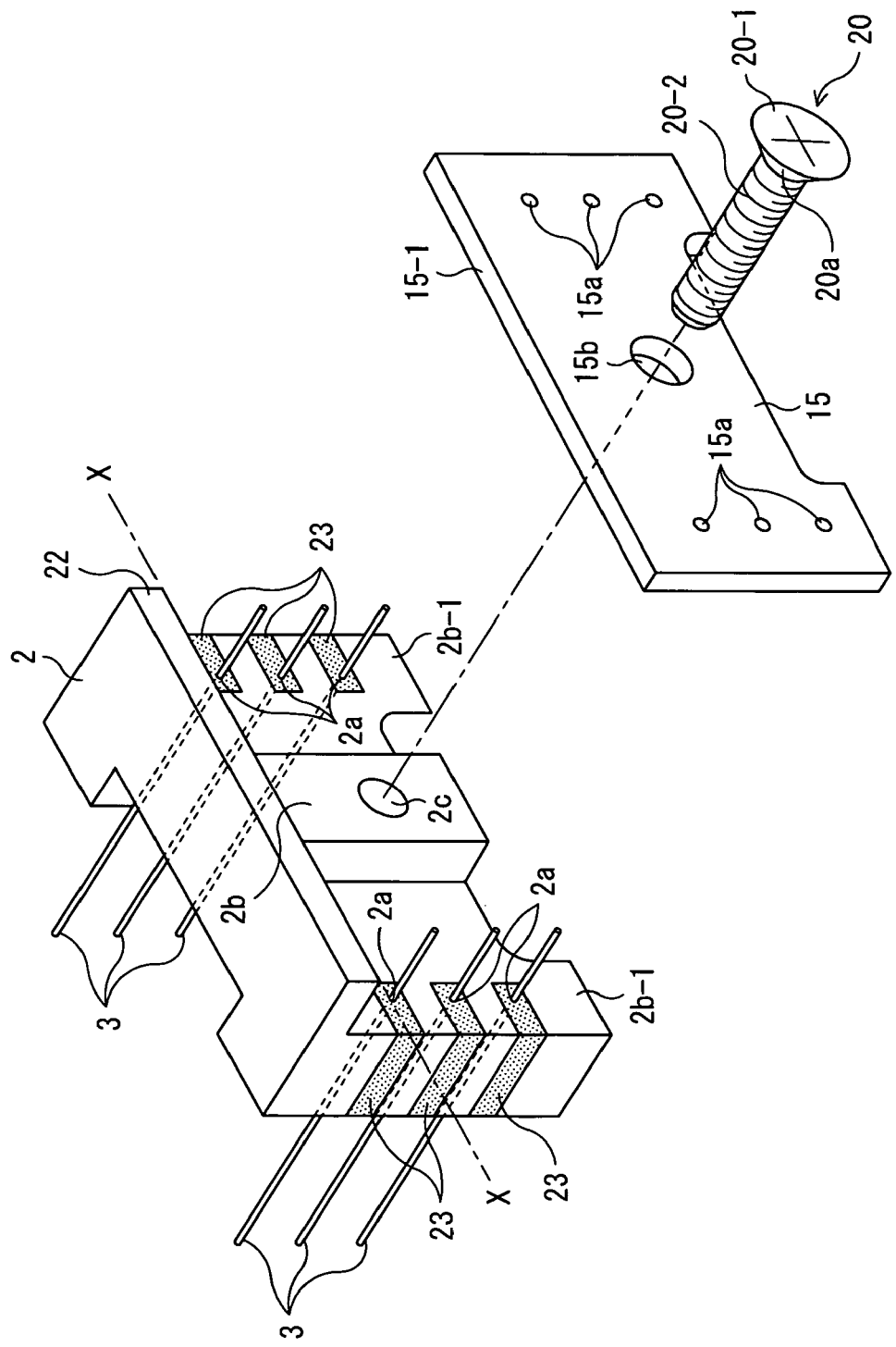
FIG. 10 is an exploded partial perspective view enlarging a printed circuit board and a support member of the pick-up device illustrated in FIG. 4.
Figure 11A:
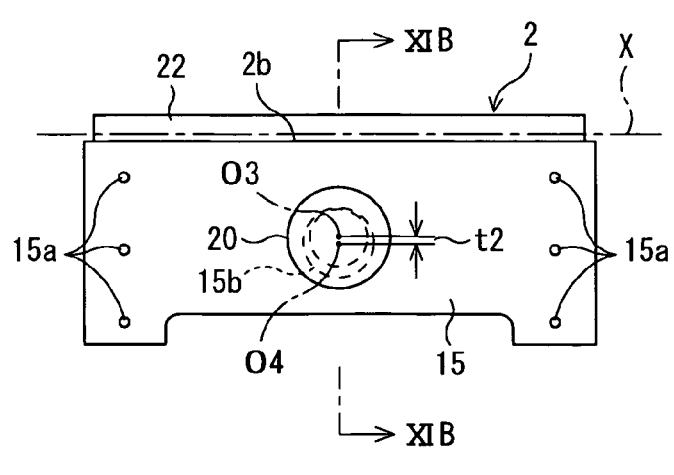
FIG. 11A is a top view of a part of the optical pick-up showing a first state for positioning the printed circuit board upon the support member of FIG. 4.
Figure 11B:
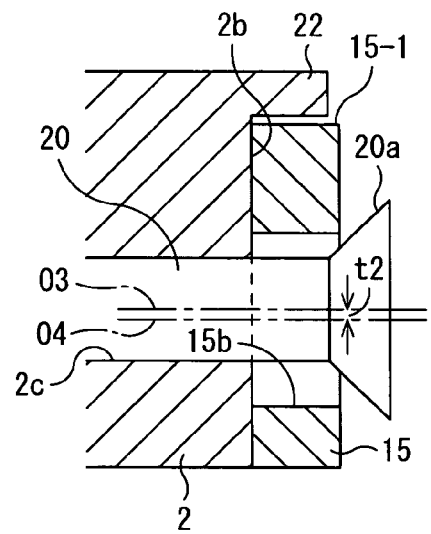
FIG. 11B is a cross-sectional view taken along a dash-dot line XIB-XIB of FIG. 11A.
Figure 11C:
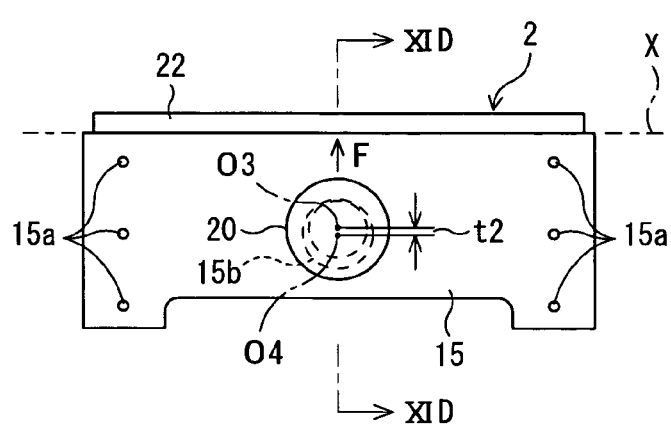
FIG. 11C is a top view of the part of the optical pick-up showing a second state for positioning the printed circuit board upon the support member of FIG. 4.
Figure 11D:
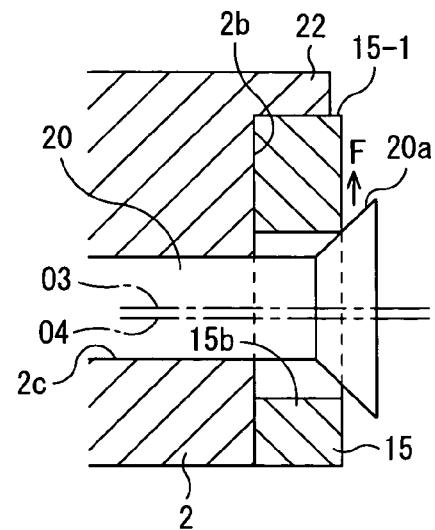
FIG. 11D is a cross-sectional view taken along a dash-dot line XID-XID of FIG. 11C.

Together with reference to FIGS. 10 through 11D, the pick-up device still further comprises a printed-circuit board 15 formed with a plurality of electrode holes 15a and a board hole 15b, the printed-circuit board 15 being arranged with the support member 2, a printed-circuit screw member 20 screwed into the screw hole 11b of the magnet holder 10 through the board hole 15b of the printed-circuit board 15 and the through-hole 2c of the support member 2, the printed-circuit board 15 being fit upon the support member 2, with the support member 2 and the magnet holder 11 integrally engaged with each other, a plurality of resilient wires 3 inserted in the grooves 2a of the support member 2, each resilient wire 3 having one end soldered into the lens holder 4 and the other end soldered through the electrode holes 15a of the print circuit board 15, the lens holder 4 being fixed with the support member 2 through each resilient wire 3, and a holder screw member 19 screwed into the screw hole 1a of the actuator base 1 through the screw hole 11a of the magnet holder 11, the magnet holder 11 being fixed upon the actuator base 1.

The support member 2 has a pair of side walls and a central wall 2b formed with a through hole 2c between the side walls 2b-1 and a standard ledge 22 protruded from its body of the support member 2 along a horizontal standard surface of a horizontal standard line of a dash-dot line X-X (FIG. 10). Besides, each outer surface of each side wall 2b-1 is formed with the grooves 2a dented along the dash-dot line X-X. Each groove 2a is filled with a resilient damper 23 for inserting the resilient wire 3.

To be secured into the through hole 2c of the central wall 2b, the board flush screw 20 has a board flush head 20-1 with a slant tapered surface 20a and a screw root 20-2. The slant tapered surface 20a of the board flush head 20-1 of the board flush screw 20 is firmly secured to be fit through the board hole 15b of a center of axle O3 and the through hole 2c of a center of o4 with a predetermined eccentric distance or interval t2, so that a top end 15-1 of the printed-circuit board 15 is pushed and pushed and pressed down upon the standard ledge 22.

As a result, the printed-circuit board 15 is fixed in a predetermined location of the central wall 2b of the support member 2.

As for operation according to the structure stated above in FIGS. 11A through 11D, the holder flush screw 20 is pushed and pushed and pressed as a holder screw member for fixing the printed-circuit board 15 upon a board receiving end surface 2a of the support member 2. Such a continuous hollow section as the board hole 15b-1 and the through hole 2c is adapted to receive the slant tapered surface 20a of the board flush head 20-1 of the board flush screw 20 with the screw root 20-2 as an externally-threaded fastener or mounting screw for fixture and positioning of the support member 2 and the printed-circuit board 15. As depicted in FIG. 11D, the top end 15-1 of the printed circuit board 15 assembled upon the board receiving end surface 2a is pushed upon the standard ledge 22 by a force F occurred upon being secured with the board flush screw 20. Each electrode holes 15a of the printed-circuit board 15 and the resilient wires 3 are appropriately set to be fixed, in such a way that a precise movement by three kinds of coil means of the focusing coil 6, the tracking coils 7 and/or the tilt coil 8 can be carried out.

As stated above, it should be noted that the board hole 15b of the printed-circuit board 15 is sized slightly greater than the through hole 2c of the support member 2 with a predetermined eccentric distance t2 between the center of axle O3 and the center of axle O4. Inasmuch as the board flush screw 20 is used as a board screw member together with a small alternation of the structure of the optical pick-up device of the related art, its cheap and simple structure is constructed. As a result, the optical pick-up device can precisely position both the support member 2 and the printed-circuit board 15 assembled upon the actuator base 1.

Another Embodiment of the Present Invention

Next, the description will proceed to an optical pick-up device of another embodiment according to the present invention with reference to FIGS. 12 through 16C.

Figure 12:
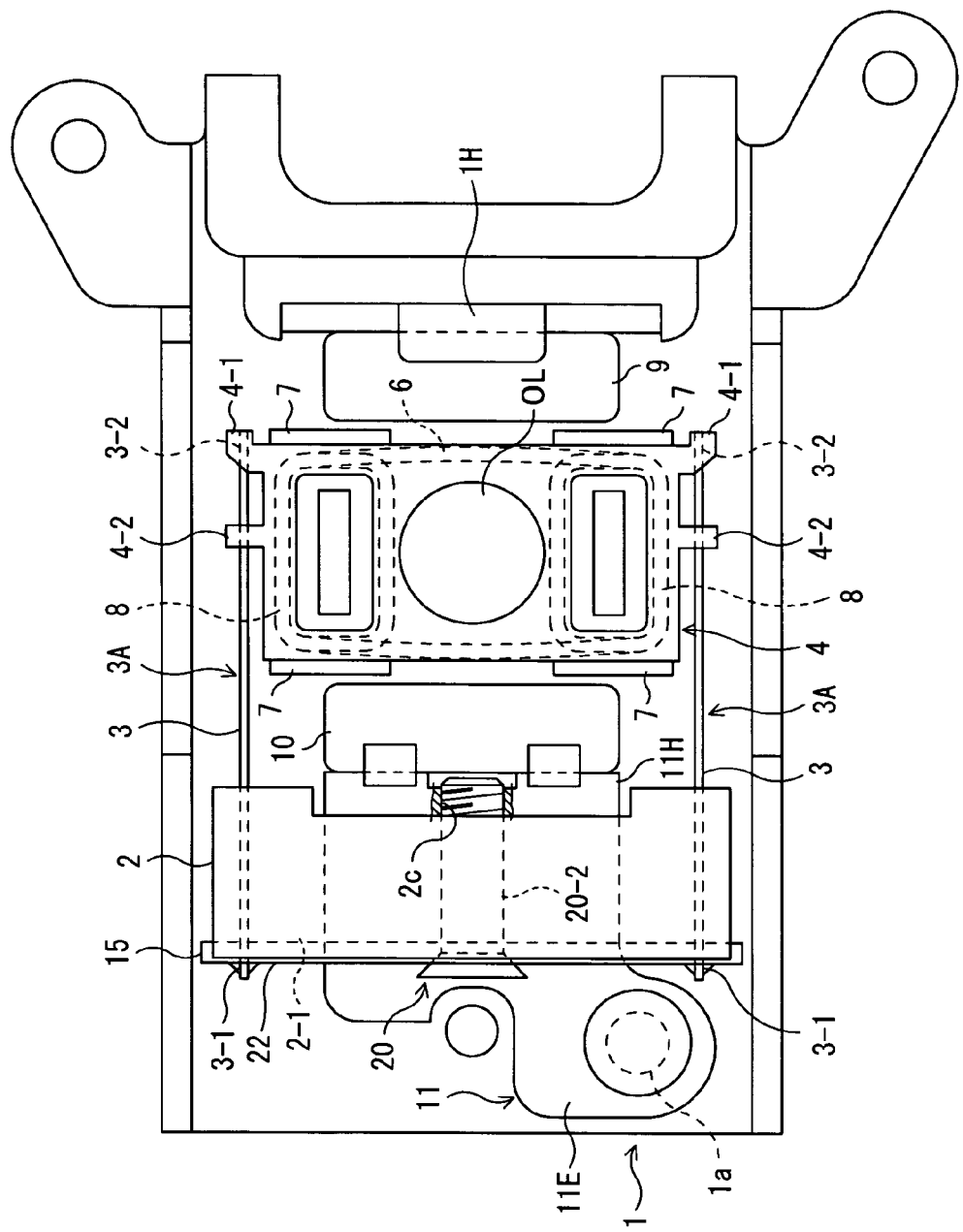
FIG. 12 is a top view of an optical pick-up device according to another embodiment of the present invention.
Figure 13:
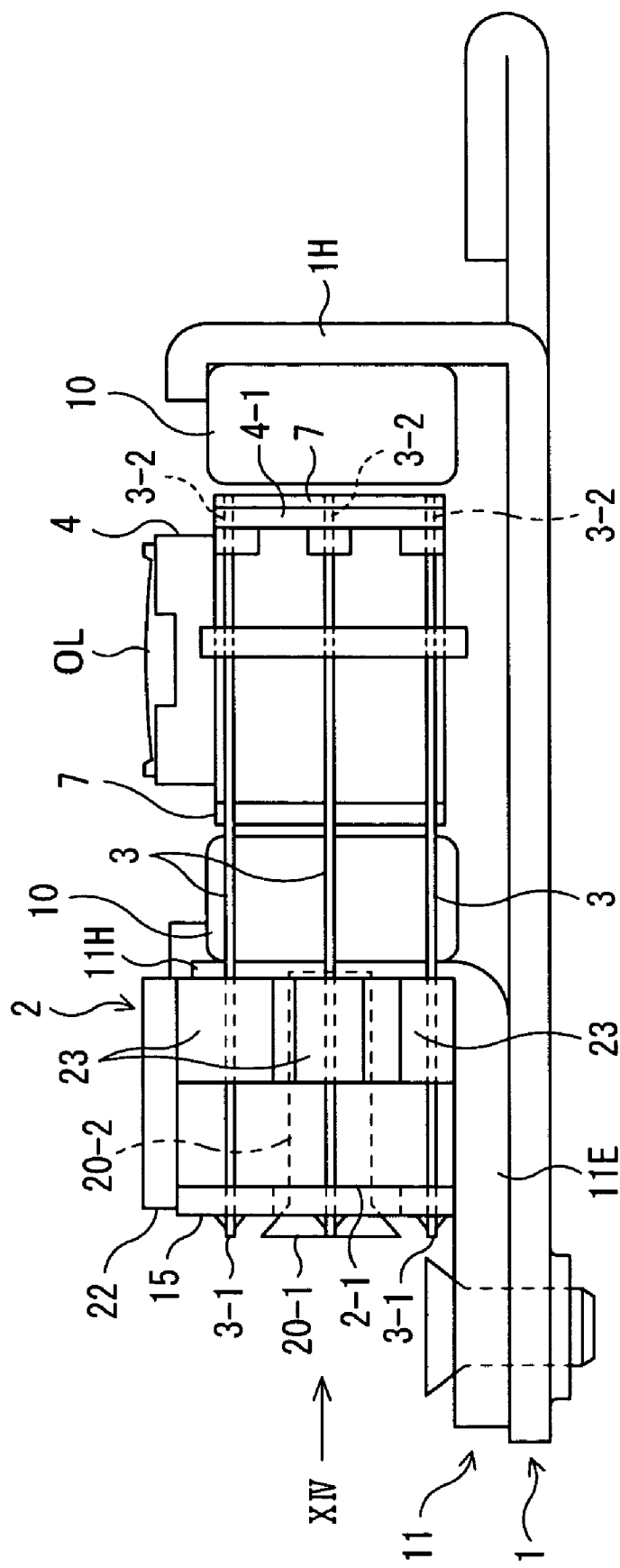
FIG. 13 is a side view of the optical pick-up device of FIG. 12.

As shown in FIGS. 12 and 13, the optical pick-up device is capable of moving a lens holder 4 including an objective lens OL in three dimensional directions positioned by three kinds of coil members of a focusing coil 6, a pair of tracking coils 7, and/or a tilt coil 8 during operation.

The optical pick-up device comprises a support member 2 having a board receiving end surface 2-1 with a through hole 2c formed, a printed-circuit board 15 which is arranged upon the board receiving surface 2-1 and which is formed with a plurality of electrode holes 15a and a board hole 15b, the printed circuit board 15 being arranged with the support member 2, a board flush screw 20 secured into the through hole 2c of the support member 2, the board flush screw 20 having a board flush head 20-1 with a slant tapered surface 20a, and a plurality of resilient wires 3 inserted in the support member 2, each resilient wire 3 having one end 3-1 fixed through the electrode holes 15a of the print-circuit board 15 and the other end 3-2 fixed into the lens holder 4, the lens holder 4 being arranged with the support member 2 through each resilient wire3. Supported by such resilient wires 3, the lens holder 4 is displaceable by the three kinds of coil members.

More specifically, the resilient wires 3 are divided into two wire groups 3A, 3B. That is to say, the resilient wires 3 are symmetrically grouped into both sides of the support member 2. Each wire group 3A,3B is composed of three resilient wires 3 upon each right and left side of the pick-up device of FIG. 12. Whereas each of one end 3-1 of each resilient wire 3 is soldered, each of the other end 3-2 of each resilient wire 3 is fixed upon each end lug 4-1 of the lens holder 4.

Figure 14:
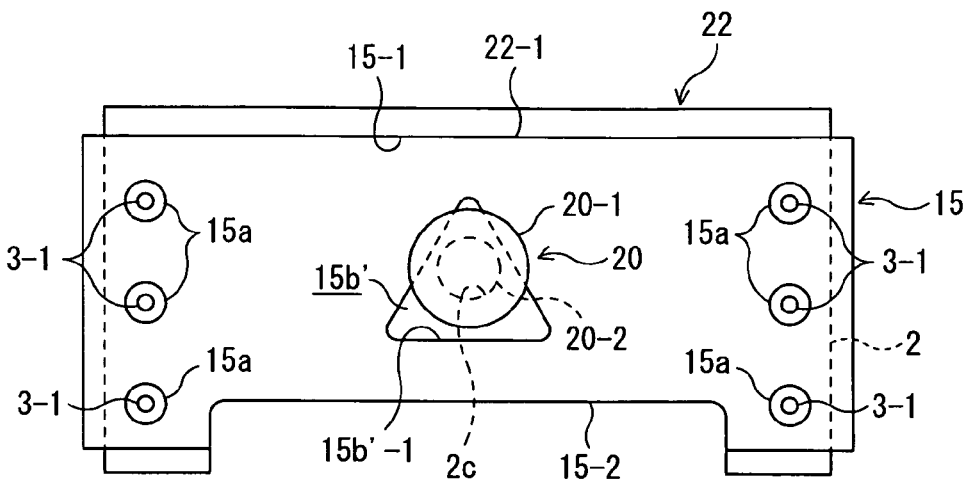
FIG. 14 is a partial front view of the optical pick-up device.

As shown in FIG. 14, it should be noted that the soldering process stated above is carried out under conditions where the electrode holes 15a formed in both sides of the printed-circuit board 15 are not brought in contact with the one ends 3-1 of the resilient wires 3. And then, both of the wire groups 3A, 3B are symmetrically grouped into both sides so as to interpose the support member 2. With a good balance towards the support member 1 by the wire groups 3A, 3B, a resilient return after displacement of the support member 1 is easily carried out with stability.

Turning to FIGS. 12 and 13, each resilient wire 3 is supported by each intermediate lug 4-2 upon the lens holder 4 which is disposed near the other end 3-2. Both sides of the support member 2 are provided with a plurality of grooves (not shown, but in correspondence to 2a of FIG. 10). Each damper member 23 for each resilient wire 3 is kept so as to be filled with each groove of the support member 2.

Furthermore, the above-mentioned three kinds of coil members act as control elements for displacing the lens holder 4, so that the coil members are electrically connected onto a circuit pattern of the printed-circuit board 15 through the electrode holes 15.

Figure 15:
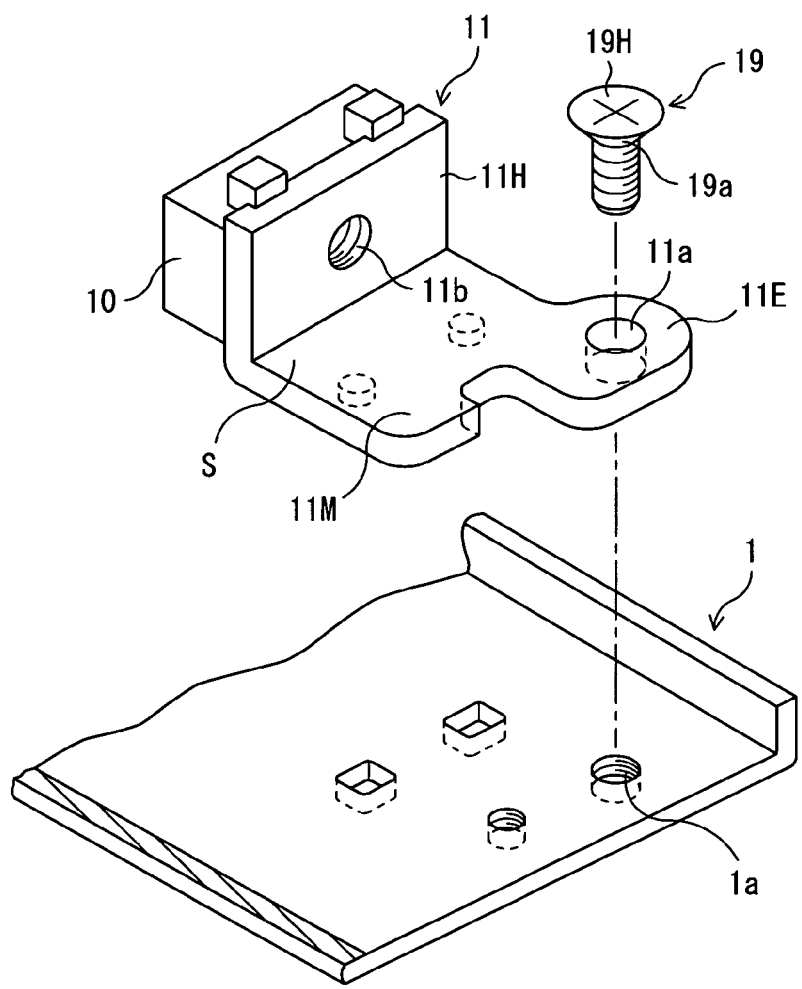
FIG. 15 is an exploded partial perspective view of the optical pick-up device.
Figure 16A:
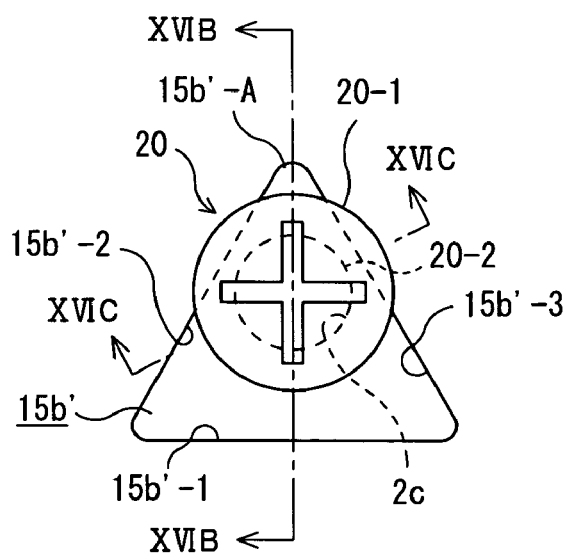
FIG. 16A is a front view of a part of the optical pick-up device.
Figure 16B:
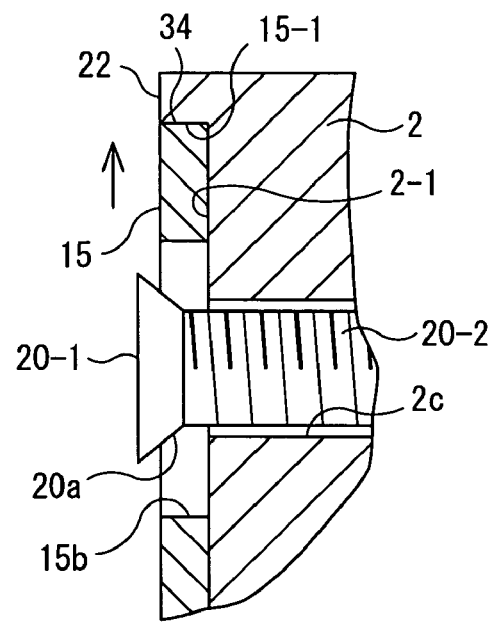
FIG. 16B is a cross-sectional view of the pick-up device taken along a dash-dot line XVIB-XVIB of FIG. 16A.
Figure 16C:
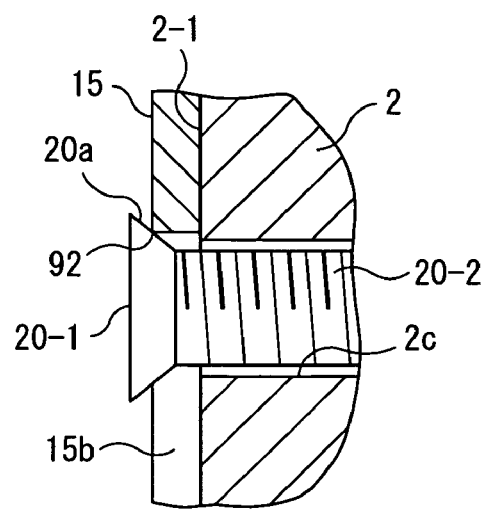
FIG. 16C is a cross-sectional view of the pick-up device taken along a dash-dot line XVIC-XVIB of FIG. 16A.

Exemplified in FIGS. 14 and 15, the support member 2 further comprises a standard ledge 22 protruded from its body. The printed-circuit board 15 comprises a triangle-shaped opening 15b' for forming a horizontal inner base surface 15b'-1 parallel to a bottom surface 15-2 of the printed-circuit board 15 and two inner side surfaces 15b'-2, 15b'-3 via an apex 15b'-A. Incidentally, the triangle-shaped opening 15b' is in correspondence to a board hole 15b of FIG. 10.

FIGS. 14 through 16C will more particularly be referred to. Such a continuous hollow section as the triangle-shape 15b'-1 etc. is adapted to receive the slant tapered surface 20a of the board flush head 20-1of the board flush screw 20 with the screw root 20-2 as an externally-threaded fastener or mounting screw for fixture and positioning of the support member 2 and the printed-circuit board 15. The board flush head 20-1is secured between the two inner side surfaces 15b'-2, 15b'-3 of the triangle-shaped opening 15b'-1 into the through hole 2c of the support member 2, so that a top end 15-1 of the printed-circuit board 15 is pushed and pushed and pressed down upon the standard ledge 22. The printed-circuit board 15 is thus positioned upon a predetermined location of the support member 2. The resilient wires 3 are fixed through each of the electrode hole 15aof the printed-circuit board 15, so that the lens holder 4 is displaceable by the resilient wires3.

Figure 7:
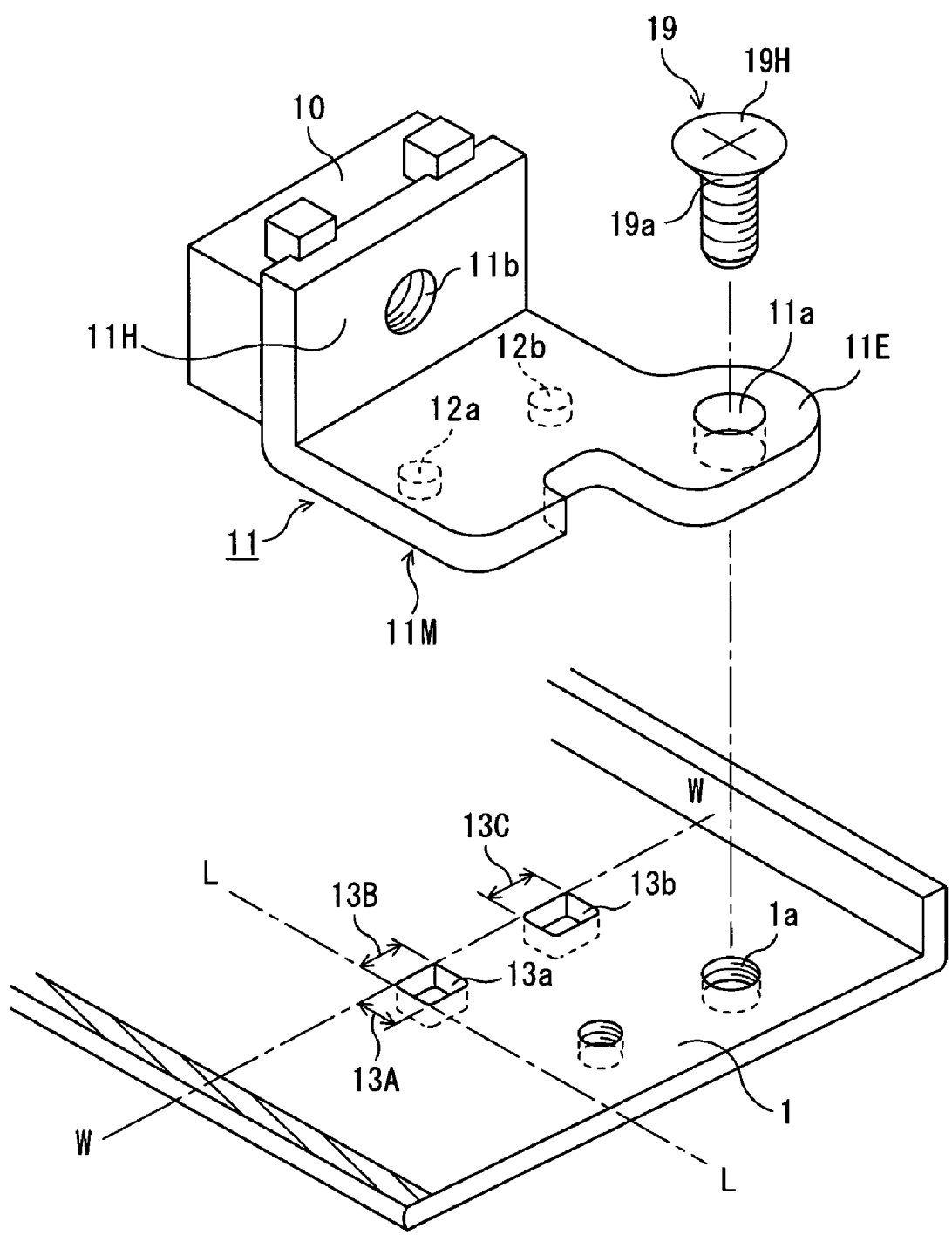
FIG. 7 is an exploded partial perspective view enlarging of the optical pick-up device illustrated in FIG. 4.

FIG. 15 is similar to FIG.7. A magnet holder 11 comprises a holding portion 11H with a screw hole 11b and a mount portion 11M to form a corner portion S and to be thereby positioned in place. Each of magnet 9, 10 is in a position to face each tracking coil 7. Both of the embodiments are the same operation.

(Availability of Industrial Field)

While there has been shown and described preferred embodiments of an optical pick-up device in accordance with the present invention, it will be appreciated that many changes and modifications may be made therein without, however, departing from the essential sprit thereof Thus the triangle-shaped opening 15b'-1 may be required with a V-shaped opening via the apex 15b'-A with a bent inner base surface instead of the straight inner base surface 15b'-1.

What is claimed is:

1. An optical pick-up device capable of moving a lens holder including an objective lens in three dimensional directions positioned by means of a focusing coil, a tracking coil, and/or a tilt coil during operation, said optical pick-up device comprising:

an actuator base having one end with a screw hole and the other end in a lengthwise direction;

a support member arranged upon said one end of said actuator base, having a pair of side walls and a central wall formed with a through hole between said side walls, each side wall being formed with a plurality of grooves; a fixed magnet adjacent to said lens holder and fixed upon said other end of said actuator base;

a holder magnet facing said fixed magnet so as to interpose said lens holder;

a magnet holder having a holding portion with a screw hole for holding said holder magnet and a mount portion for slidably mounting upon said actuator base, said mount portion being composed of a mount body and a mount tongue portion which is formed with a holder hole and is elongated from said mount body;

a pair of positioning pins protruding from a sliding surface of said mount portion of said magnet holder, said positioning pins being inserted in a pair of positioning holes formed with said actuator base;

a printed-circuit board formed with a plurality of electrode holes and a board hole, said printed-circuit board being arranged with said support member; a printed-circuit screw member screwed into said screw hole of said magnet holder through said board hole of said printed-circuit board and said through-hole of said support member, said printed-circuit board being fit upon said support member, with said support member and said magnet holder integrally engaged with each other; a plurality of resilient wires inserted in said grooves of said support member, each resilient wire having one end soldered into said lens holder and the other end soldered through said electrode holes of said print circuit board, said lens holder being fixed with said support member through each resilient wire; and a holder screw member screwed into said screw hole of said actuator base through said holder hole of said magnet holder, said magnet holder being fixed upon said actuator base;

wherein one of said positioning holes of said actuator base have one inner circumference face less than the other of said positioning holes, each inner circumference face forming a first standard surface in said lengthwise direction for prescribing a first standard length and a second standard surface for prescribing a second standard length in a direction orthogonal to said lengthwise direction, each of first standard surfaces of said one and the other inner circumference faces having a substantially same dimension and one second standard surface of said one inner circumference face is less than the other second surface of said other inner circumference face;

wherein said holder hole of said magnet holder is eccentrically greater than said screw hole of said actuator base;

wherein said holder screw member is a holder flush screw having a holder flush head with a slant tapered surface secured into said holder hole, said one positioning pin being pushed and pushed and pressed onto said first standard surface; wherein said other positioning pin is pushed and pushed and pressed onto said second standard surface of said other positioning hole, whereby said holder magnet and said objective lens are positioned upon a predetermined location of said lengthwise direction and/or said direction orthogonal to said lengthwise direction of said actuator base; wherein said support member comprises a standard ledge protruded from its body along a horizontal standard surface that is perpendicular to both said first standard surface and said second standard surface;

wherein said printed-circuit board has a board hole with a board flush screw secured into said through hole of said central wall; and wherein said board flush screw is secured to be fit through said board hole and said through hole, so that a top end of said printed-circuit board is pushed and pushed and pressed down upon said standard ledge, whereby said printed-circuit board is fixed in a predetermined location of said support member.

2. An optical pick-up device capable of moving a lens holder including an objective lens in dimensional directions positioned by means of a focusing coil and/or a tracking coil during operation, said optical pick-up device comprising:

an actuator base having one end with a screw hole and the other end in a lengthwise direction;

a support member arranged upon said one end of said actuator base, having a pair of side walls and a central wall formed with a through hole between said side walls, each side wall being formed with a plurality of grooves;

a fixed magnet adjacent to said lens holder and fixed upon said other end of said actuator base;

a holder magnet facing said fixed magnet so as to interpose said lens holder;

a magnet holder having a holding portion with a screw hole for holding said holder magnet and a mount portion for slidably mounting upon said actuator base, said mount portion being composed of a mount body and a mount tongue portion which is formed with a holder hole and is elongated from said mount body;

a pair of positioning pins protruding from a sliding surface of said mount portion of said magnet holder, said positioning pins being inserted in a pair of positioning holes formed with said actuator base;

a printed-circuit board formed with a plurality of electrode holes and a board hole, said printed-circuit board being arranged with said support member;

a printed-circuit screw member screwed into said screw hole of said magnet holder through said board hole of said printed-circuit board and said through-hole of said support member, said printed-circuit board being fit upon said support member, with said support member and said magnet holder integrally engaged with each other; a plurality of resilient wires inserted in said grooves of said support member, each resilient wire having one end soldered into said lens holder and the other end soldered through said electrode holes of said print circuit board, said lens holder being fixed with said support member through each resilient wire; and a holder screw member screwed into said screw hole of said actuator base through said holder hole of said magnet holder, said magnet holder being fixed upon said actuator base;

wherein one of said positioning holes of said actuator base have one inner circumference face less than the other of said positioning holes, each inner circumference face forming a first standard surface in said lengthwise direction for prescribing a first standard length and a second standard surface for prescribing a second standard length in a direction orthogonal to said lengthwise direction, each of first standard surfaces of said one and the other inner circumference faces having a substantially same dimension and one second standard surface of said one inner circumference face is less than the other second surface of said other inner circumference face;

wherein said holder hole of said magnet holder is eccentrically greater than said screw hole of said actuator base;

wherein said holder screw member is a holder flush screw having a holder flush head with a slant tapered surface secured into said holder hole, said one positioning pin being pushed and pushed and pressed onto said first standard surface; and wherein said other positioning pin is pushed and pushed and pressed onto said second standard surface of said other positioning hole, whereby said holder magnet and said objective lens are positioned upon a predetermined location of said lengthwise direction and/or said direction orthogonal to said lengthwise direction of said actuator base.

3. An optical pick-up device according to claim 2, wherein said support member comprises a standard ledge protruded from its body along a horizontal standard surface that is perpendicular to both said first standard surface and said second standard surface;

wherein said printed-circuit board has a board hole with a board flush screw secured into said through hole of said central wall, said board flush screw having a board flush head with a slant tapered surface; and wherein said slant tapered surface of said board flush head of said board flush screw is secured to be fit through said board hole and said through hole, so that a top end of said printed-circuit board is pushed and pushed and pressed down upon said standard ledge, whereby said printed-circuit board is fixed in a predetermined location of said central wall of said support member.

4. An optical pick-up device capable of moving a lens holder including an objective lens; said optical pick-up device comprising:

a support member having a through hole;

a printed-circuit board formed with a plurality of electrode holes and a board hole, said printed circuit board being arranged with said support member; a board flush screw secured into said through hole of said support member, said board flush screw having a board flush head with a slant tapered surface; and a plurality of resilient wires inserted in said support member, each resilient wire having one end fixed into said lens holder and the other end fixed through said electrode holes of said print-circuit board, said lens holder being arranged with said support member through each resilient wire;

wherein said support member comprises a standard ledge protruded from its body;

wherein said board hole is a triangle-shaped opening for forming an inner base surface and two inner side surfaces, said board flush screw being secured between said two inner side surfaces of said triangle-shaped opening into said support member, so that a top end of said printed-circuit board is pushed and pushed and pressed down upon said standard ledge, whereby said printed-circuit board is positioned upon a predetermined location of said support member;

wherein said resilient wires is fixed through each of said electrode hole of said printed-circuit board, so that said lens holder is displaceable by said resilient wires;

wherein said one end and said other end of each resilient wire are soldered;

wherein said resilient wires are symmetrically grouped into both sides of said support member; and wherein said optical pick-up further comprises a coil member as a control element for displacing said lens holder, so that said coil member is electrically connected onto a circuit pattern of said printed-circuit board through said electrode holes.

5. An optical pick-up device capable of moving a lens holder including an objective lens; said optical pick-up device comprising:

a support member having a through hole;

a printed-circuit board formed with a plurality of electrode holes and a board hole, said printed circuit board being arranged with said support member;

a board flush screw secured into said through hole of said support member, said board flush screw having a board flush head with a slant tapered surface; and a plurality of resilient wires inserted in said support member, each resilient wire having one end fixed into said lens holder and the other end fixed through said electrode holes of said print-circuit board, said lens holder being arranged with said support member through each resilient wire;

wherein said support member comprises a standard ledge protruded from its body; and wherein said board hole is a triangle-shaped opening for forming an inner base surface and two inner side surfaces, said board flush screw being secured between said two inner side surfaces of said triangle-shaped opening into said support member, so that a top end of said printed-circuit board is pushed and pushed and pressed down upon said standard ledge, whereby said printed-circuit board is positioned upon a predetermined location of said support member.

6. An optical pick-up device according to claim 5, wherein each of said resilient wires is fixed through each of said electrode holes of said printed-circuit board, so that said lens holder is displaceable by said resilient wires.

7. An optical pick-up device according to claim 5, wherein said one end and said other end of each resilient wire are soldered.

8. An optical pick-up device according to claim 6, wherein said resilient wires are symmetrically grouped into both sides of said support member.

9. An optical pick-up device according to claim 5, wherein said optical pick-up further comprises a coil member as a control element for displacing said lens holder, so that said coil member is electrically connected onto a circuit pattern of said printed-circuit board through said electrode holes.

10. An optical pick-up device according to claim 6, wherein said one end and said other end of each resilient wire are soldered.

11. An optical pick-up device according to claim 7, wherein said resilient wires are symmetrically grouped into both sides of said support member.

12. An optical pick-up device according to claim 6, wherein said optical pick-up further comprises a coil member as a control element for displacing said lens holder, so that said coil member is electrically connected onto a circuit pattern of said printed-circuit board through said electrode holes.

13. An optical pick-up device according to claim 7, wherein said optical pick-up further comprises a coil member as a control element for displacing said lens holder, so that said coil member is electrically connected onto a circuit pattern of said printed-circuit board through said electrode holes.

14. An optical pick-up device according to claim 8, wherein said optical pick-up further comprises a coil member as a control element for displacing said lens holder, so that said coil member is electrically connected onto a circuit pattern of said printed-circuit board through said electrode holes.

* * * * *